US012283443B2

(12) United States Patent
Ryu

(10) Patent No.: US 12,283,443 B2
(45) Date of Patent: Apr. 22, 2025

(54) SWITCH DEVICE AND ASSEMBLY METHOD

(71) Applicant: ALPS ALPINE CO., LTD., Tokyo (JP)

(72) Inventor: Darang Ryu, Gwangju (KR)

(73) Assignee: ALPS ALPINE CO., LTD., Tokyo (JP)

(*) Notice: Subject to any disclaimer, the term of this patent is extended or adjusted under 35 U.S.C. 154(b) by 87 days.

(21) Appl. No.: 18/062,835

(22) Filed: Dec. 7, 2022

(65) Prior Publication Data

US 2023/0095864 A1 Mar. 30, 2023

Related U.S. Application Data

(63) Continuation of application No. PCT/JP2021/019350, filed on May 21, 2021.

(30) Foreign Application Priority Data

Jun. 24, 2020 (JP) ................................ 2020-108984

(51) Int. Cl.
*H01H 25/00* (2006.01)
*H01H 11/00* (2006.01)

(52) U.S. Cl.
CPC .......... *H01H 25/002* (2013.01); *H01H 11/00* (2013.01); *H01H 2221/012* (2013.01); (Continued)

(58) Field of Classification Search
CPC ................. H01H 25/002; H01H 11/00; H01H 2221/012; H01H 2221/014; (Continued)

(56) References Cited

U.S. PATENT DOCUMENTS 11,574,782 B2 * 2/2023 Choi .................... H01H 25/008
2018/0114656 A1 * 4/2018 Salagean ................ H01H 23/16
(Continued)

FOREIGN PATENT DOCUMENTS

JP 2016-213120 12/2016
WO 2019/187343 10/2019

OTHER PUBLICATIONS

International Search Report for PCT/JP2021/019350 mailed on Jul. 27, 2021.

*Primary Examiner* — Lheiren Mae A Caroc
(74) *Attorney, Agent, or Firm* — IPUSA, PLLC

(57) ABSTRACT

A switch device includes an operation knob on which a sliding operation can be performed in a horizontal direction, a holder member that holds the operation knob and moves in the horizontal direction, a drive member that tilts as the holder member moves in the horizontal direction, a switch that is pressed down by the drive member as the drive member tilts, and a support member that supports the holder member such that the holder member can move in the horizontal direction. The holder member has a base at a center in the horizontal direction and a flange extending outward from the base in the horizontal direction. The support member has an upper wall that restricts a movement of the holder member in a vertical direction by contacting an upper surface of the flange, and a slit between the upper wall and a middle wall lower than the upper wall.

9 Claims, 19 Drawing Sheets

(52) U.S. Cl.
CPC ... *H01H 2221/014* (2013.01); *H01H 2225/01* (2013.01); *H01H 2229/066* (2013.01)

(58) Field of Classification Search
CPC ......... H01H 2225/01; H01H 2229/066; H01H 15/16; H01H 25/00
See application file for complete search history.

(56) References Cited

U.S. PATENT DOCUMENTS

| | | | | |
|---|---|---|---|---|
| 2018/0114664 | A1 * | 4/2018 | Salagean ................ | H01H 23/08 |
| 2020/0388452 | A1 | 12/2020 | Yamagata | |

* cited by examiner

SWITCH DEVICE AND ASSEMBLY METHOD

CROSS-REFERENCE TO RELATED APPLICATION

This application is a continuation application of International Application No. PCT/JP2021/019350 filed on May 21, 2021, and designating the U.S., which is based upon and claims priority to Japanese Patent Application No. 2020-108984, filed on Jun. 24, 2020, the entire contents of which are incorporated herein by reference.

BACKGROUND

1. Field of the Invention

The present disclosure relates to a switch device and an assembly method.

2. Description of the Related Art

Patent Document 1 discloses a switch device for a vehicle power seat with a cam mechanism that can return an operation knob to an initial position by returning a tilted drive member to a neutral position by the restoring force of a rubber dome switch, for example.

RELATED ART DOCUMENTS

Patent Documents

Patent Document 1: International Publication Pamphlet No. WO 2019/187343

SUMMARY

According to one aspect of the present disclosure, a switch device includes an operation knob on which a sliding operation can be performed in a horizontal direction, a holder member configured to hold the operation knob and move in the horizontal direction integrally with the operation knob, a drive member configured to tilt as the holder member moves in the horizontal direction, a switch that is pressed down by the drive member as the drive member tilts, and a support member that supports the holder member such that the holder member can move in the horizontal direction. The holder member has a base that is provided at a center in the horizontal direction and a flange that extends outward from the base in the horizontal direction. The support member has an upper wall that restricts a movement of the holder member in a vertical direction by contacting an upper surface of the flange, and a slit that is provided between the upper wall and a middle wall lower than the upper wall and that has a fixed vertical width.

DETAILED DESCRIPTION

In the technique disclosed in Patent Document 1, the drive member is supported by a support member and a holder member is supported by a housing. Because the drive member and the holder member are the core members of the operation transmission system, if these members are supported by respective different members (the support member and the housing), a rattling movement caused by looseness of fit between components in the operation transmission system may become large due to the accumulation of dimensional tolerances of respective components. Therefore, the rattling movement of the operation knob connected to the operation transmission system may become large.

In the following, one embodiment will be described with reference to the drawings. Here, in the following descriptions, for convenience, a direction parallel to the XY plane is referred to as a "horizontal direction" and the Z-axis direction is referred to as a "vertical direction".

(Overview of a Switch Device 100)

Figure 1:
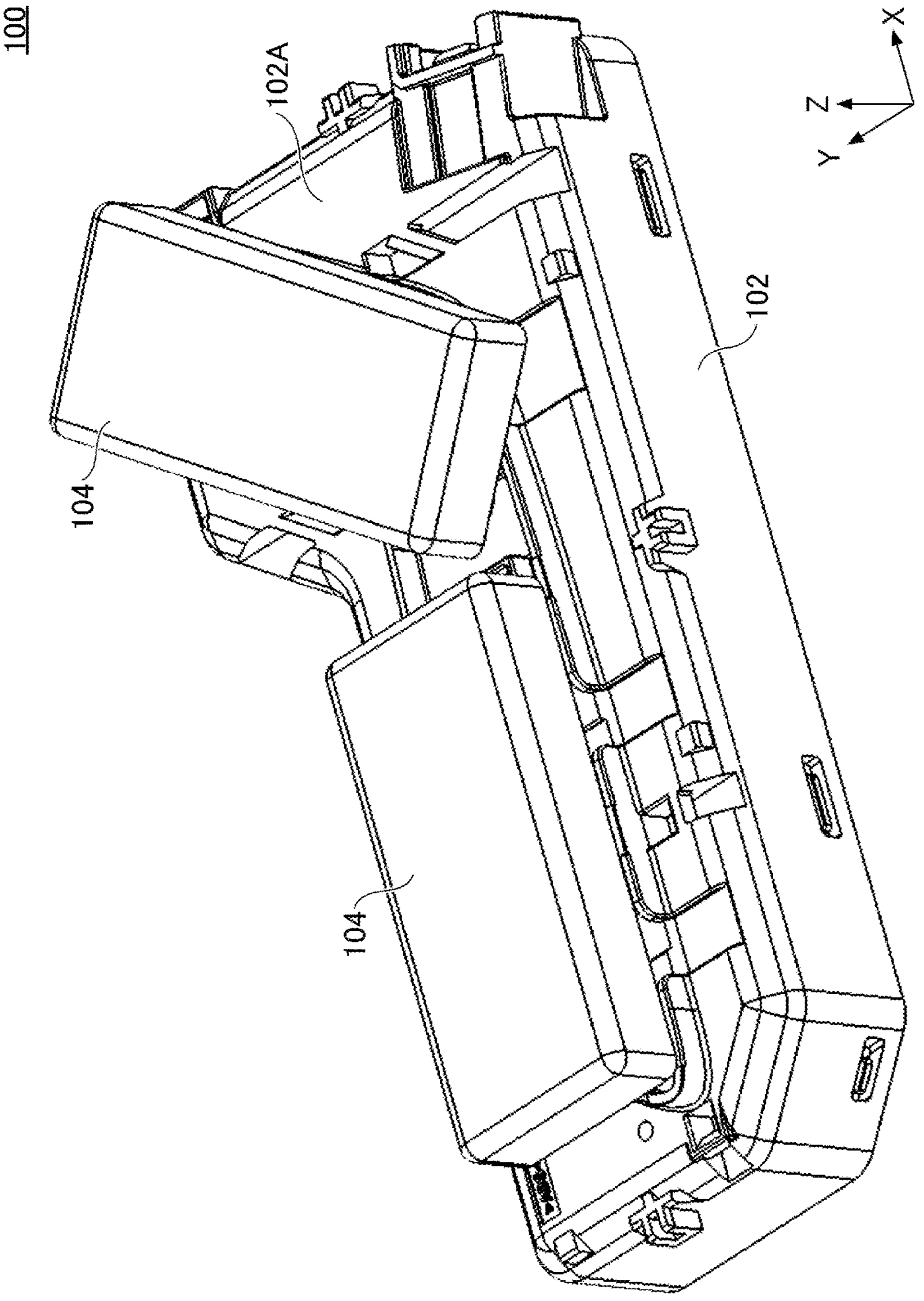
FIG. 1 is an external perspective view of a switch device according to one embodiment.
Figure 2:
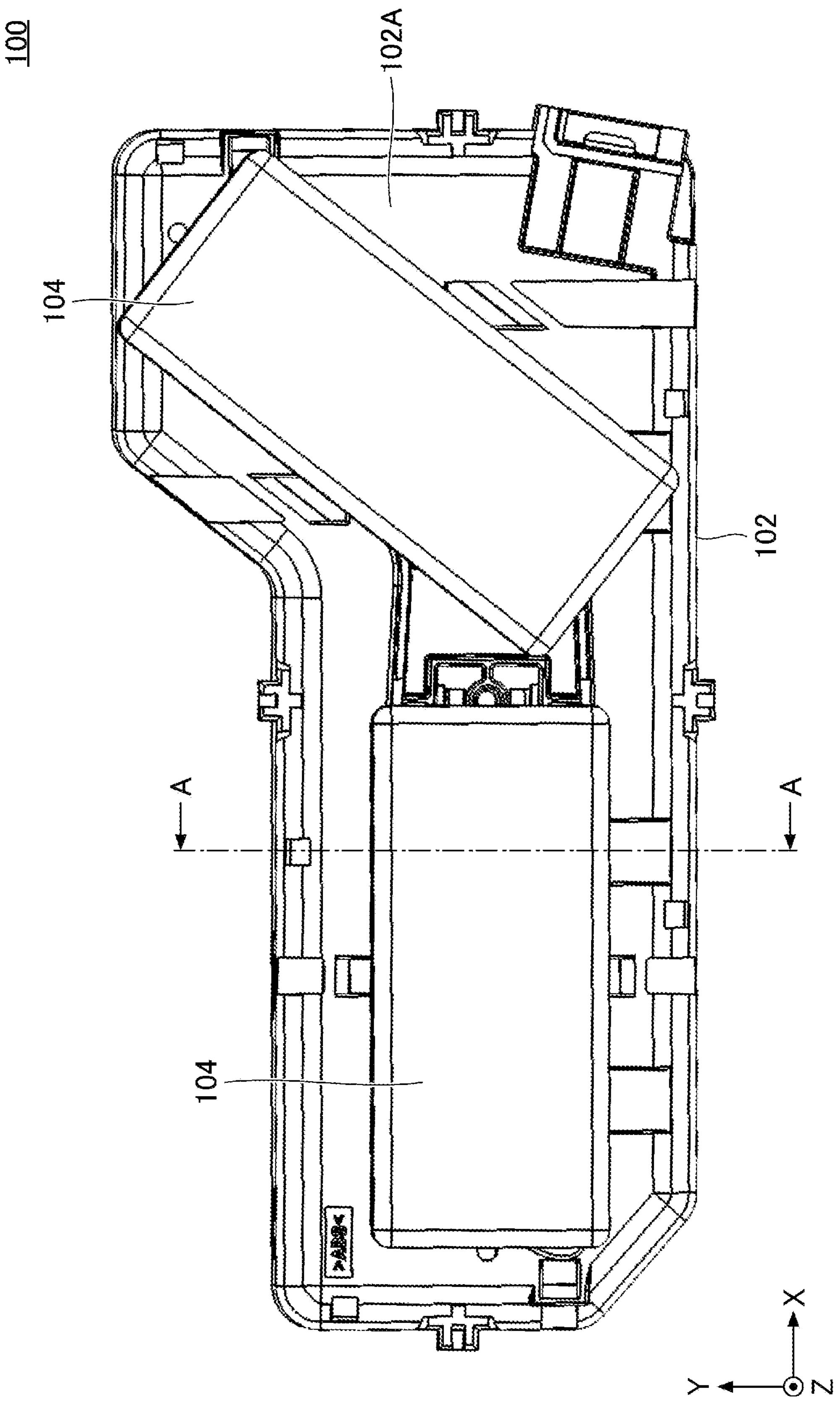
FIG. 2 is a plan view of the switch device according to one embodiment.
Figure 3:
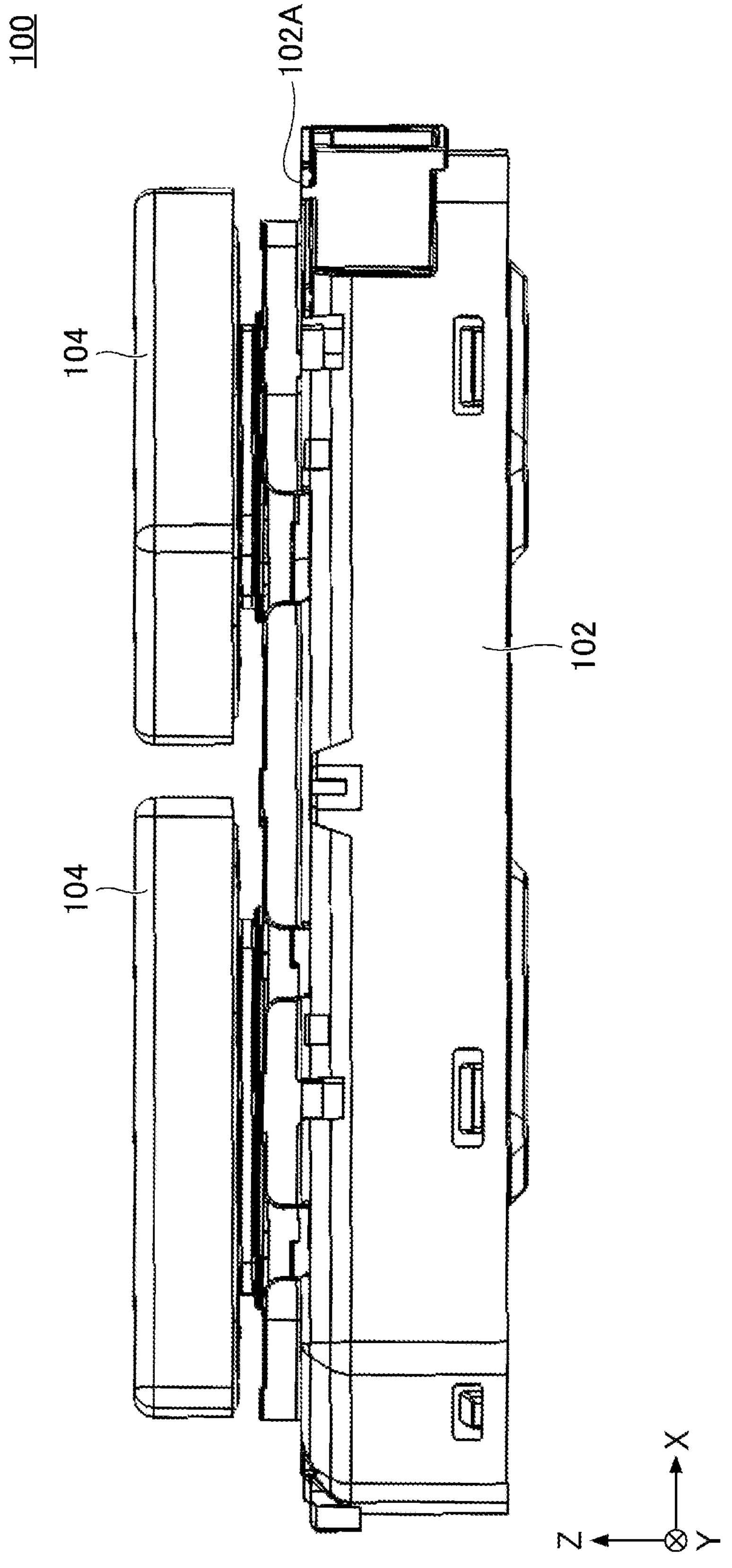
FIG. 3 is a side view of the switch device according to one embodiment.

FIG. 1 is an external perspective view of a switch device 100 according to one embodiment. FIG. 2 is a plan view of the switch device 100 according to one embodiment. FIG. 3 is a side view of the switch device 100 according to one embodiment.

The switch device 100 illustrated in FIGS. 1 to 3 is a device operated by a user to drive a power seat of a vehicle. For example, the switch device 100 is installed on a predetermined installation surface in the vehicle (for example, an inner panel of a door, a side surface of a seating face of a seat, and the like).

As illustrated in FIG. 1, the switch device 100 includes a case 102 and an operation knob 104. The operation knob 104 is provided projecting upward with respect to an upper surface 102A of the case 102. The operation knob 104 is an operation member on which a sliding operation is performed to perform various adjustments of the power seat (for example, a reclining adjustment, a height adjustment, a tilt adjustment, a front and rear alignment). The operation knob 104 can slide in the horizontal direction (in a direction parallel to the upper surface 102A and the XY plane of the case 102) by the user operating the sliding operation. Here, in the examples illustrated in FIGS. 1 to 3, the switch device 100 includes two operation knobs 104 that allow switch operations different from each other.

The switch device 100 is electrically connected to a control unit (not illustrated) installed in the vehicle through connection members (not illustrated) such as connectors and cables. This allows the switch device 100 to output an electric signal corresponding to the sliding operation of the operation knob 104 to the control unit and cause the control unit to control the power seat.

(Configuration of the Switch Device 100)

Figure 4:
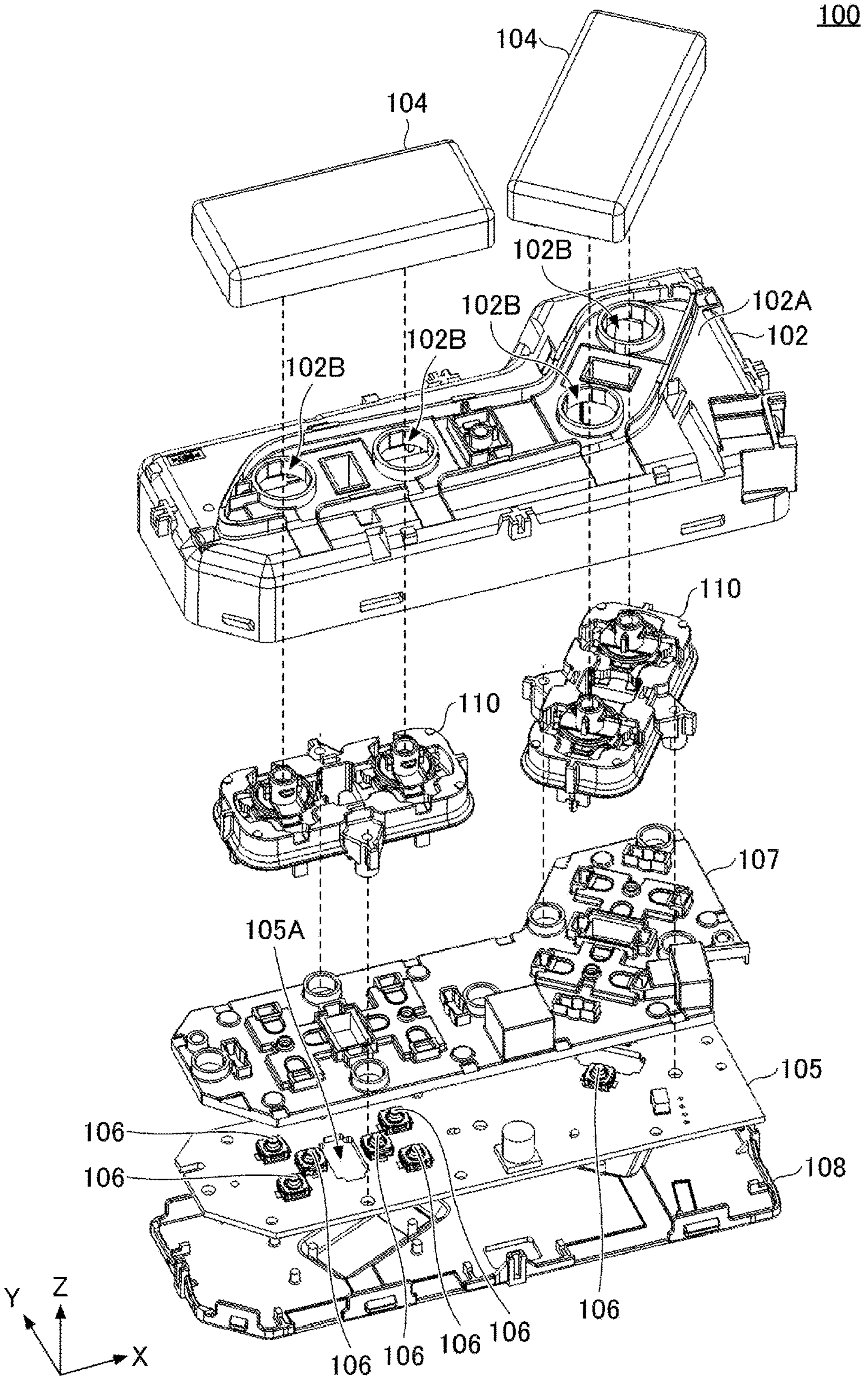
FIG. 4 is an exploded perspective view of the switch device according to one embodiment.
Figure 5:
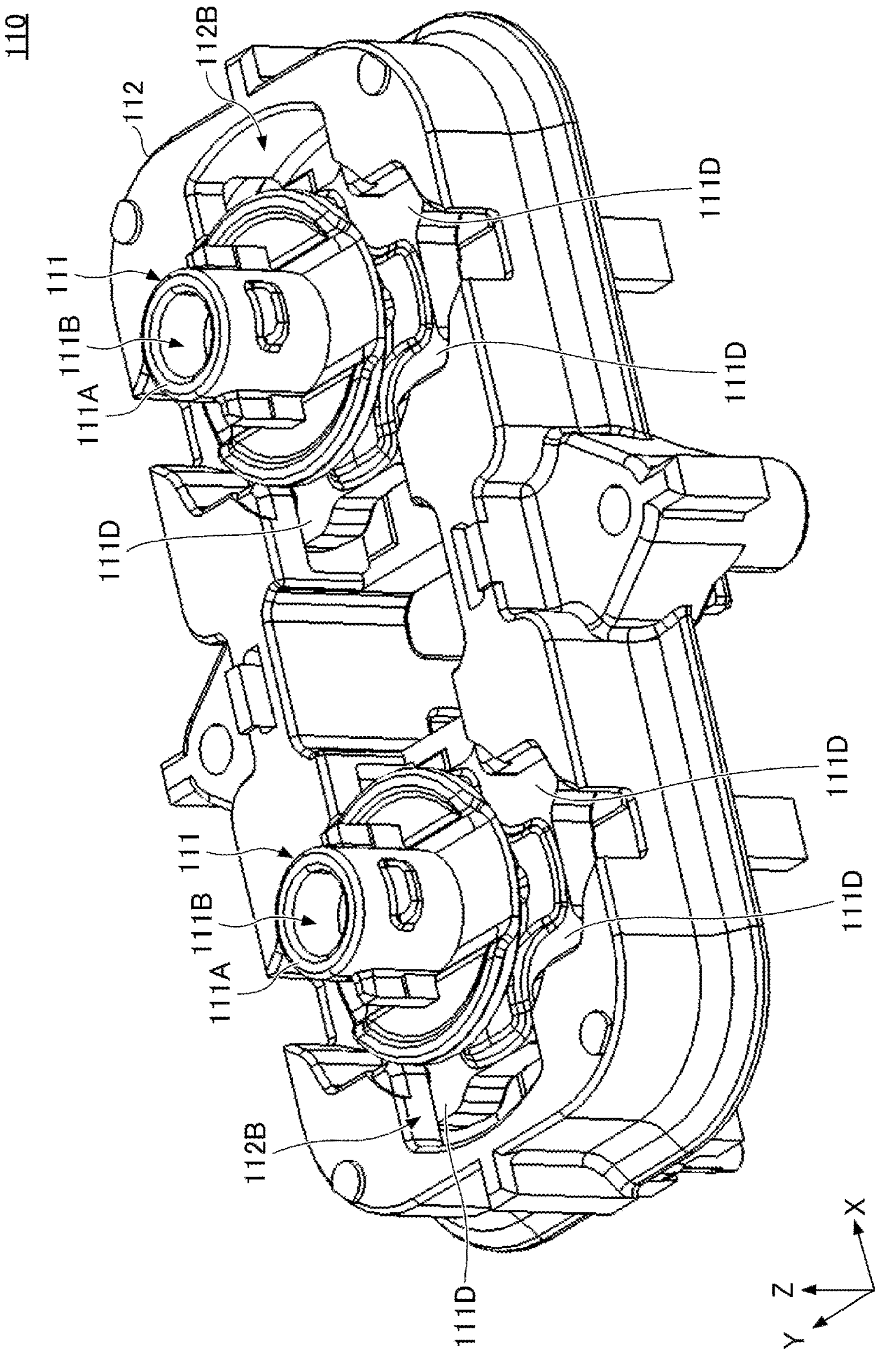
FIG. 5 is an external perspective view of a holder unit according to one embodiment.
Figure 6:
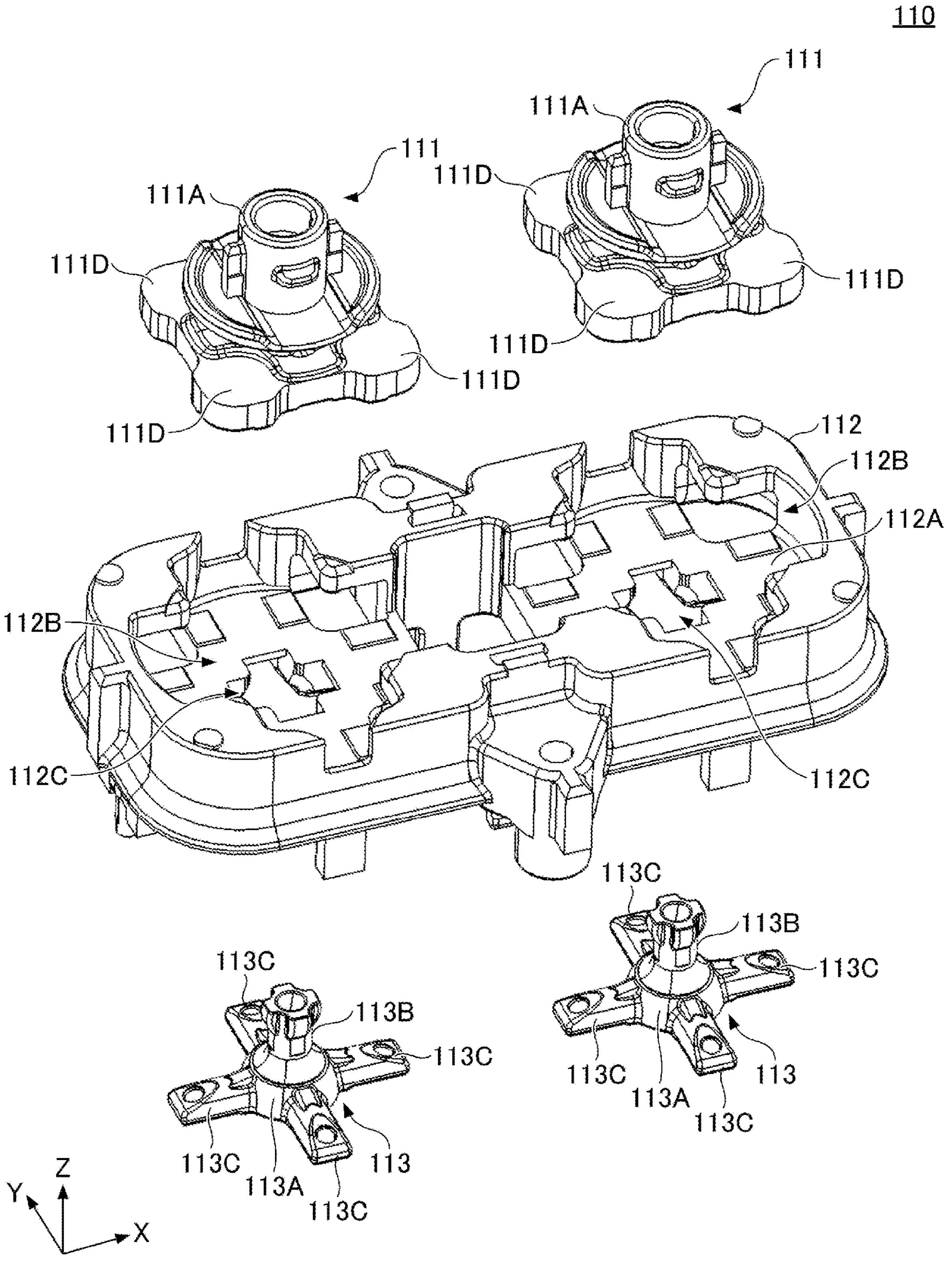
FIG. 6 is an exploded perspective view of the holder unit according to one embodiment.
Figure 7:
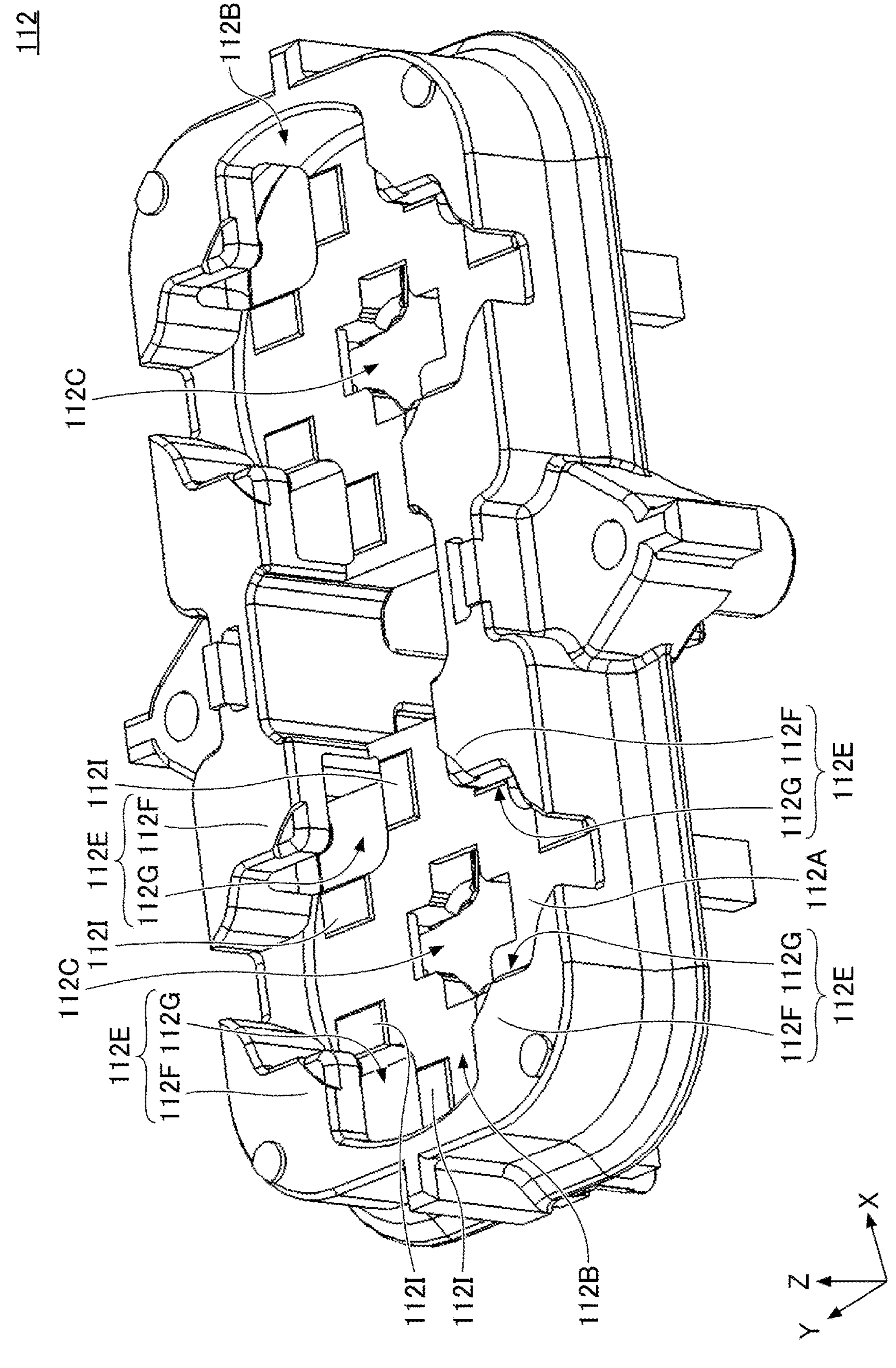
FIG. 7 is an external perspective view of a support member from the upper surface side of the support member in one embodiment.
Figure 8:
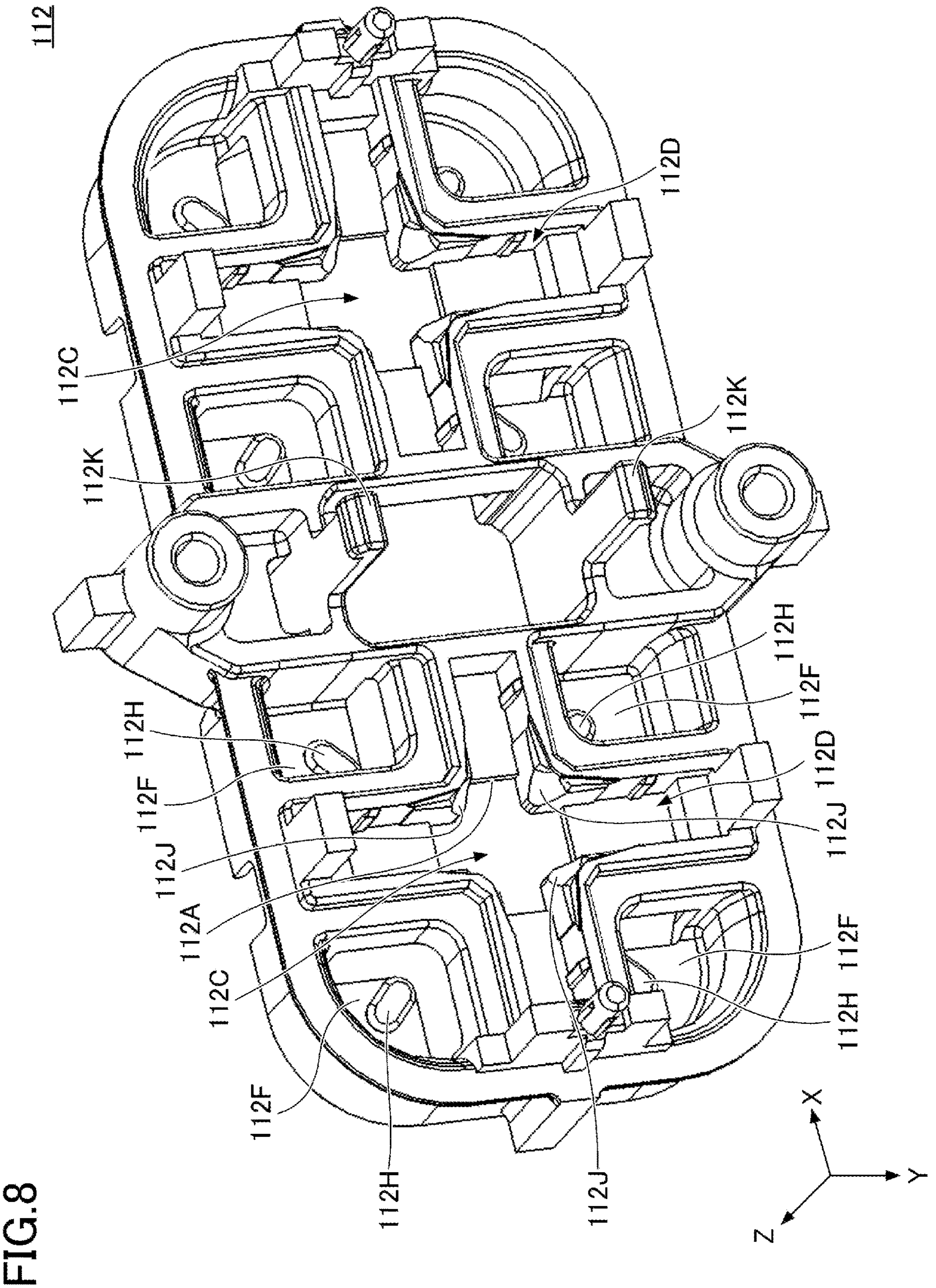
FIG. 8 is an external perspective view of the support member from the bottom surface side of the support member in one embodiment.
Figure 9:
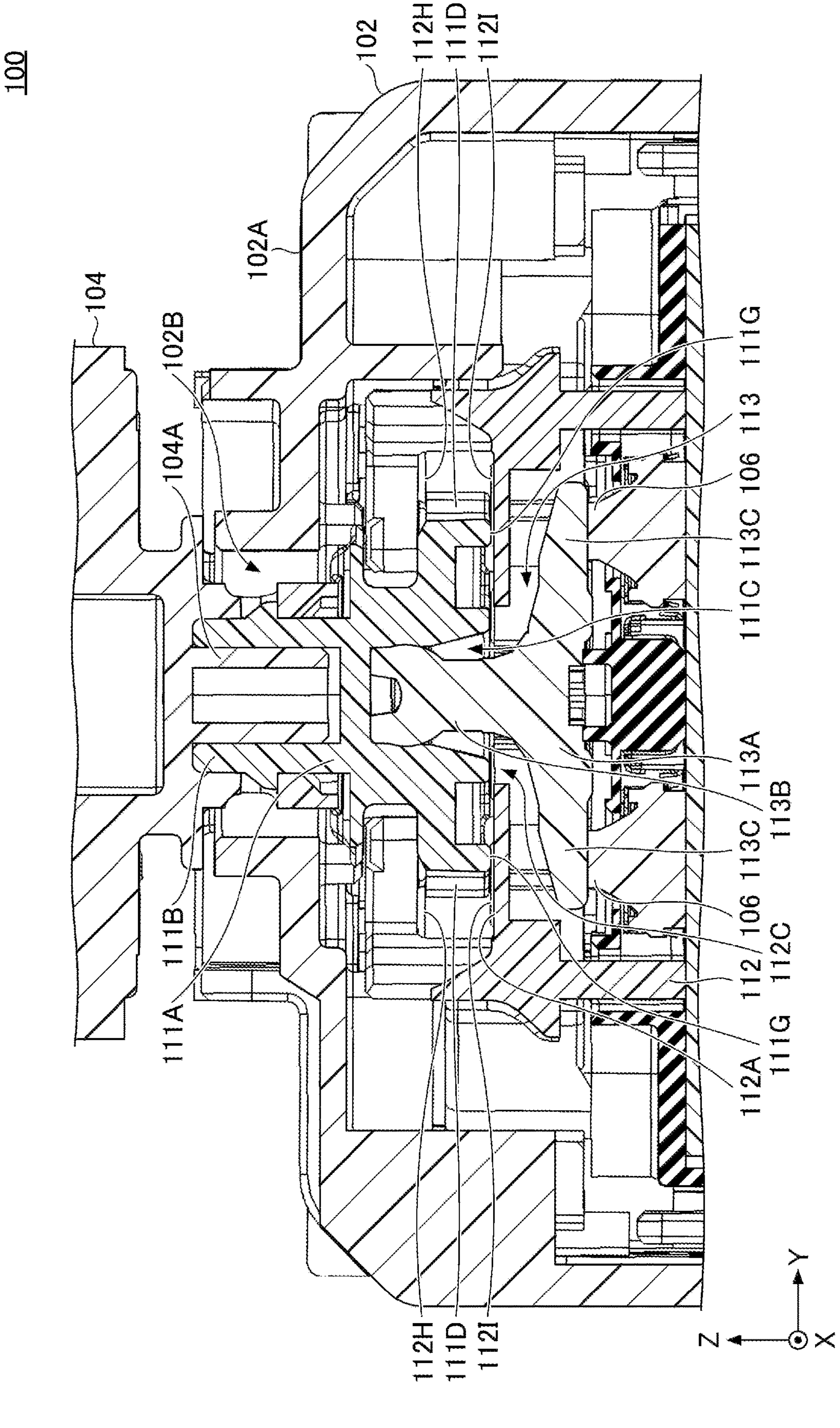
FIG. 9 is an A-A cross-sectional view of the switch device illustrated in FIG. 2.
Figure 23:
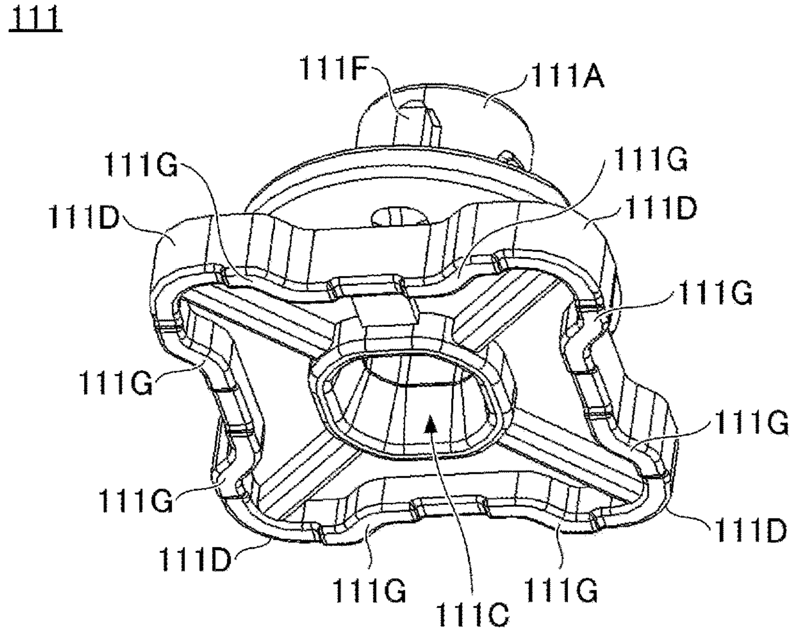
FIG. 23 is a downward perspective view of the holder member according to one embodiment.

FIG. 4 is an exploded perspective view of the switch device 100 according to one embodiment. FIG. 5 is an external perspective view of a holder unit 110 according to one embodiment. FIG. 6 is an exploded perspective view of the holder unit 110 according to one embodiment. FIG. 7 is an external perspective view of a support member 112 according to one embodiment as viewed from the upper surface side. FIG. 8 is an external perspective view of the support member 112 according to one embodiment from the bottom surface side. FIG. 9 is an A-A cross-sectional view of the switch device 100 illustrated in FIG. 2. FIG. 23 is a downward perspective view of the holder member 111 according to one embodiment.

As illustrated in FIG. 4, the switch device 100 includes, from top to bottom, the operation knob 104, the case 102, the holder unit 110, a rubber sheet 107, a circuit board 105, and an under-panel 108.

In the switch device 100, when the sliding operation is performed on the operation knob 104, the holder member 111 illustrated in FIG. 6 slides and moves and the movement causes a shaft 113B of the drive member 113 to receive an operating force in the horizontal direction, so that the drive member 113 tilts. At this time, the drive member 113 tilts with an arm 113C, and the tilted arm 113C presses multiple switches 106 illustrated in FIG. 4 through the rubber sheet 107. Because the multiple switches 106 are pressed in a direction corresponding to a direction in which the operation knob 104 is operated, the direction in which the operation knob 104 is operated can be detected.

The structure will be described in detail below. The case 102 is a container member having an internal space and a lower opening on the lower side. The case 102, for example, is formed by injection molding of a resin material. Additionally, on the upper surface 102A of the case 102, two openings 102B are formed for one operation knob 104. The opening 102B is a portion where a shaft 104A of the operation knob 104 is inserted. The lower opening of the case 102 is closed by the attachment of the under-panel 108. The inner space of the case 102 accommodates the holder unit 110, the rubber sheet 107, and the circuit board 105.

The operation knob 104 is provided projecting upward from the upper surface 102A of the case 102. The operation knob 104 is a member on which a user operation is performed. In the present embodiment, the operation knob 104 has a cuboid shape that is thin in the vertical direction (the Z-axis direction). As illustrated in FIG. 9, the operation knob 104 has the shaft 104A extending downward from the bottom surface thereof. The shaft 104A is connected to the holder member 111 through the opening 102B famed on the upper surface of the case 102. This allows the operation knob 104 to be held by the holder member 111, so that the operation knob 104 can slide in the horizontal direction integrally with the holder member 111.

The holder unit 110 is provided for each operation knob 104. That is, the switch device 100 of the present embodiment includes two holder units 110 corresponding to two operation knobs 104 as illustrated in FIG. 4. The two holder units 110 have configurations identical to each other. The configuration of the holder unit 110 is illustrated in detail in FIGS. 5 to 8. As illustrated in FIG. 5 and FIG. 6, the holder unit 110 includes the holder member 111, the support member 112, and the drive member 113.

Here, in the present embodiment, the holder unit 110 includes two holder members 111 and two drive members 113 arranged side by side in the horizontal direction. Additionally, the operation knob 104 has two shaft 104A arranged side by side in the horizontal direction, and is connected to the two holder members 111 by the two shafts 104A. This allows the switch device 100 of the present embodiment to simultaneously drive the two drive members 113 through the two holder members 111 by operating the operation knob 104 in the horizontal direction.

The holder member 111 is provided below the shaft 104A of the operation knob 104 and coaxially with the shaft 104A. The holder member 111 is a member that holds the shaft 104A of the operation knob 104 and that moves in the horizontal direction integrally with the operation knob 104 when the sliding operation of the operation knob 104 is performed. The holder member 111 has a cylindrical base 111A extending in the vertical direction (the Z-axis direction) at the center in the horizontal direction thereof. As illustrated in FIG. 9, the shaft 104A of the operation knob 104 is fitted from above into an upper cylinder 111B of the base 111A. This allows the holder member 111 to hold the shaft 104A of the operation knob 104. As illustrated in FIG. 9, an upper end portion of the shaft 113B of the drive member 113 is fitted into a lower cylinder inner portion 111C of the base 111A. This allows the holder member 111 to hold the shaft 113B of the drive member 113, so that the drive member 113 can be tilted when the holder member 111 moves in the horizontal direction integrally with the operation knob 104. Additionally, as illustrated in FIG. 5 and FIG.

6, the holder member 111 has, at the lower end thereof, a flange 111D that extends outward in the horizontal direction from the base 111A. The flange 111D is a horizontal flat plate having a constant thickness in the vertical direction. As illustrated in FIG. 5 and FIG. 6, in the present embodiment, the holder member 111 has four flanges 111D projecting in each of the four horizontal directions with 90 degree intervals around the base 111A. Additionally, as illustrated in FIG. 23, the holder member 111 has a sliding contact surface 111G provided on the lower surface side of the holder member 111, continuing from the lower surface of the flange 111D. The lower surface of the flange 111D and the sliding contact surface 111G are horizontally flat parts. The upper surface of the flange 111D, the lower surface of the flange 111D, and the sliding contact surface 111G are provided parallel to each other. After assembly, the upper surface of the flange 111D is a surface to slidably contact an upper side contact surface 112H, which will be described in detail later. The lower surface of the flange 111D is a surface that contacts a lower side contact surface 112I in the assembly process described later in detail. After assembly, the sliding contact surface 111G is a surface to slidably contact the lower side contact surface 112I, which will be described in detail later. In the present embodiment, the holder member 111 is formed such that, with the upper surface of the flange 111D as a height reference plane, the height of the lower surface of the flange 111D is shorter than the height of the sliding contact surface 111G, and the lower surface of the flange 111D and the sliding contact surface 111G are formed continuously. Additionally, a joint between the lower surface of the flange 111D and the sliding contact surface 111G is famed in a smooth slope shape. However, the height of the lower surface of the flange 111D may be formed lower than or equal to the height of the sliding contact surface 111G, and thus the height of the lower surface of the flange 111D may be equal to the height of the sliding contact surface 111G. The flange 111D and the sliding contact surface 111G are formed such that the height of the lower surface of the flange 111D is lower than or equal to the height of the sliding contact surface 111G, so that the work of inserting the flange 111D into a slit 112G is facilitated when the holder member 111 rotates around the base 111A in the assembly process described later in detail.

The support member 112 is provided on the lower side of the holder member 111. The support member 112 supports the holder member 111 movably in the horizontal direction and supports the drive member 113 such that the drive member 113 can tilt. As illustrated in FIG. 6, the support member 112 has a middle wall 112A having a horizontal plate shape. Additionally, the support member 112 has a recess 112B that is recessed in a cross shape on the upper side of the middle wall 112A. As illustrated in FIG. 5, the holder member 111 is arranged in the recess 112B. The support member 112 supports the holder member 111 movably in the horizontal direction in the recess 112B. Additionally, as illustrated in FIG. 7, the support member 112 has an accommodating part 112D on the lower side of the middle wall 112A, which is substantially the same shape as the outer shape of the drive member 113 (i.e., a cross shape in plan view). The accommodating part 112D accommodates the drive member 113 such that the drive member 113 can tilt. Additionally, as illustrated in FIG. 6 and FIG. 7, an opening 112C is formed in the middle wall 112A. The opening 112C is a part through which the shaft 113B of the drive member 113 accommodated in the accommodating part 112D is inserted.

Here, the configuration of the recess 112B of the support member 112 will be described in detail with reference to FIG. 7 and FIG. 8. As illustrated in FIG. 7, the recess 112B has a shape recessed in a cross shape having four grooves respectively extending from its center in four horizontal directions (the positive X-axis, the negative X-axis, the positive Y-axis, and the negative Y-axis).

Additionally, as illustrated in FIG. 7, the support member 112 has four interior corners 112E, of which all angles are right angles, that contact the outer peripheral edge of the recess 112B. An upper wall 112F and a slit 112G are formed in each of the four interior corners 112E. The upper wall 112F is a horizontal plate part having a constant thickness and a right-angle shape along the edge of the interior corner 112E in plan view, and is provided at a position higher than the middle wall 112A. The slit 112G is a space famed between the upper wall 112F and the middle wall 112A. The support member 112 can support the holder member 111 movably in the horizontal direction while restricting the movement of the holder member 111 in the vertical direction by inserting the flange 111D of the holder member 111 into the slit 112G.

Additionally, as illustrated in FIG. 8, an upper side contact surface 112H is provided at a position where the lower surface of the upper wall 112F slightly projects downward in the corner of the lower surface of the upper wall 112F. The upper side contact surface 112H is a horizontal flat portion that locally contacts the upper surface of the flange 111D of the holder member 111 inserted into the slit 112G. By locally contacting the upper surface of the flange 111D of the holder member 111, the upper side contact surface 112H can suppress the sliding resistance of the movement of the holder member 111 in the horizontal direction while restricting the upward movement of the holder member 111. Additionally, the holder member 111 is a resin member that is molded using mold technology, and the upper side contact surface 112H is provided as a local part. When perform molding using mold technology, it is easy to improve the dimensional accuracy of the partial shape provided as the local part, and the upper side contact surface 112H is provided with high dimensional accuracy. According to this, by causing the upper side contact surface 112H to contact the upper surface of the flange 111D, the movement of the flange 111D can be restricted with high accuracy.

Additionally, as illustrated in FIG. 7, lower side contact surfaces 112I are provided at positions where the middle wall 112A slightly projects upward in the upper surface of the middle wall 112A (portions touching two sides forming the interior corner 112E). The lower side contact surface 112I is a horizontal flat portion that contacts the lower surface of the flange 111D when the holder member 111 is disposed in the recess 112B through the transition from the state illustrated in FIG. 18 to the state illustrated in FIG. 19 in the assembly process described later in detail. The lower side contact surface 112I is provided parallel to the upper side contact surface 112H. The lower side contact surface 112I is a surface disposed opposite to the upper side contact surface 112H, and is disposed in a position where the surfaces do not overlap when viewed in plan view in one embodiment. The switch device 100 has a configuration in which the lower side contact surface 112I can contact the lower surface of the flange 111D, so that the vertical height alignment of the holder member 111 and the support member 112 can be performed quick and accurately in the assembly process. Additionally, the sliding contact surface 111G having a flat shape is provided on the lower surface of the holder member 111, as illustrated in FIG. 9. Additionally, as illustrated in FIG. 20, in the assembly process, in the lower side contact surface 112I, the holder member 111 arranged in the recess 112B is rotated 45 degrees around the base 111A, and the flange 111D of the holder member 111 is inserted into the slit 112G. At the same time, the sliding contact surface 111G provided on the lower surface side of the holder member 111, continuously with the lower surface of the flange 111D contacts the lower side contact surface 112I. The sliding contact surface 111G and the lower side contact surface 112I are provided such that the sliding contact surface 111G and the lower side contact surface 112I can contact with each other and slide with each other. In the switch device 100 according to one embodiment, the lower surface of the flange 111D and the sliding contact surface 111G are continuously provided. This facilitates the rotating of the holder member 111 in the assembly process of the holder member 111 and the support member 112.

Additionally, the switch device 100 according to one embodiment is provided such that the lower side contact surface 112I and the sliding contact surface 111G can slide with each other. This can restrict the downward movement of the holder member 111 when the holder member 111 slides in the horizontal direction after assembly and suppress the sliding resistance of the horizontal movement of the holder member 111.

The support member 112 is a resin member molded by using a mold, and the lower side contact surface 112I is provided with a flat shape as a local portion of the support member 112. The lower side contact surface 112I is then provided with high dimensional accuracy by using molding techniques.

Here, as illustrated in FIG. 9, the distance between the upper side contact surface 112H and the lower side contact surface 112I is the same size as the distance between the upper surface of the flange 111D and the sliding contact surface 111G of the holder member 111. Thus, in the switch device 100 according to one embodiment, the rattling movement of the flange 111D of the holder member 111 in the vertical direction is not caused by the slit 112G. As a result, the holder member 111 can move in the horizontal direction without the rattling movement when the operation knob 104 is operated.

Additionally, as illustrated in FIG. 8, curved surfaces 112J are respectively formed in the four interior corners of the cross-shaped accommodating part 112D in the support member 112. The curved surface 112J has a shape curved along the surface of a central section 113A of the drive member 113.

Additionally, as illustrated in FIG. 8, the support member 112 has a pair of claws 112K provided projecting downward from the bottom surface thereof. The pair of claws 112K engage the opening edge of the opening 105A (see FIG. 4) formed in the circuit board 105 by a snap fit structure. This allows the support member 112 to be fixed to the upper surface of the circuit board 105.

The drive member 113 is a member that tilts with the horizontal movement of the operation knob 104 and the holder member 111, and presses the switch 106 corresponding to the tilting direction. As illustrated in FIG. 6, the drive member 113 has the central section 113A, the shaft 113B, and the four arms 113C. The central section 113A is located at the center in the accommodating part 112D of the support member 112 and is the central part of the tilting of the drive member 113. Resilient forces of the multiple switches 106 are transmitted through the four arms 113C, so that the central section 113A is pushed upward. This causes the central section 113A to contact and press the curved surfaces 112J (see FIG. 8) respectively formed in the four interior corners 112E of the accommodating part 112D in the support member 112. The central section 113A rotates while sliding against the curved surface 112J of the support member 112 as the shaft 113B tilts. The shaft 113B is a columnar portion extending vertically upward from the central section 113A. The shaft 113B penetrates through the opening 112C of the support member 112 and projects upward from the middle wall 112A of the support member 112. The upper end of the shaft 113B is fitted into the lower cylinder inner portion 111C of the base 111A of the holder member 111. This connects the drive member 113 to the holder member 111, and when the operation knob 104 and the holder member 111 move in the horizontal direction in accordance with the sliding operation of the operation knob 104, the drive member is operated by the holder member 111 to tilt with the central section 113A as the rotating center. The four arms 113C are arm-shaped portions respectively extending from the central section 113A to the four horizontal directions having 90 degree intervals. That is, the four arms 113C are arranged in a cross shape centered at the central section 113A in plan view. Each arm 113C is a portion that presses the switch 106 provided under the arm 113C by rotating downward around the central section 113A.

The circuit board 105 is a flat-plate member that extends along the horizontal direction. An electronic circuit is implemented on the circuit board 105. Multiple switches 106 are provided on the upper surface of the circuit board 105. Each of the multiple switches 106 is provided under any one arm 113C among the four arms 113C of the drive member 113. This causes each of the multiple switches 106 to be pressed by the lower surface of the one arm 113C and switched to the ON state when, with the tilting of the drive member 113, the one arm 113C corresponding to the tilting direction is rotated downward. For example, a rubber dome switch is used for each of the multiple switches 106. With this, each of the multiple switches 106 can urge the arm 113C of the drive member 113 upward by the restoring force thereof. Thus, each of the multiple switches 106 can restore the drive member 113 to a neutral state.

The rubber sheet 107 is a member, having a sheet shape, made of an elastic and waterproof material (for example, rubber, silicon, and the like). The rubber sheet 107 covers the entire upper surface of the circuit board 105 to prevent the circuit board 105 from being flooded.

Next, a method of attaching the holder member 111 to the support member 112 will be described with reference to FIGS. 10 to 14.

Figure 10:
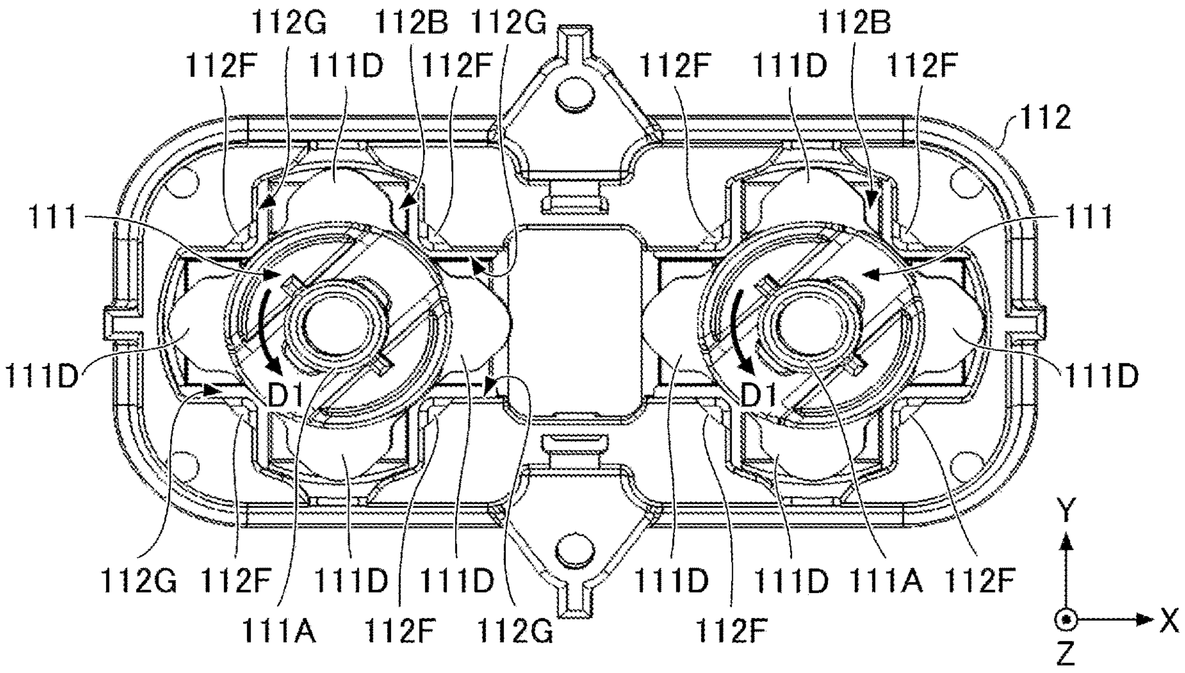
FIG. 10 is a plan view of the support member (in a state in which a flange of a holder member is not engaged) according to one embodiment.
Figure 11:
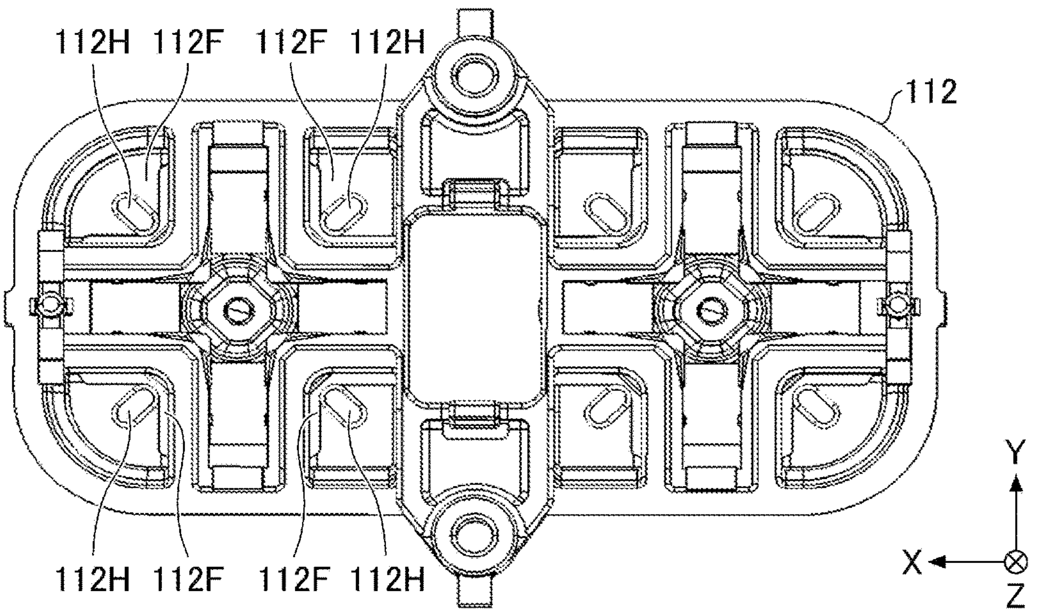
FIG. 11 is a bottom view of the support member (in a state in which a flange of a holder member is not engaged) according to one embodiment.
Figure 12:
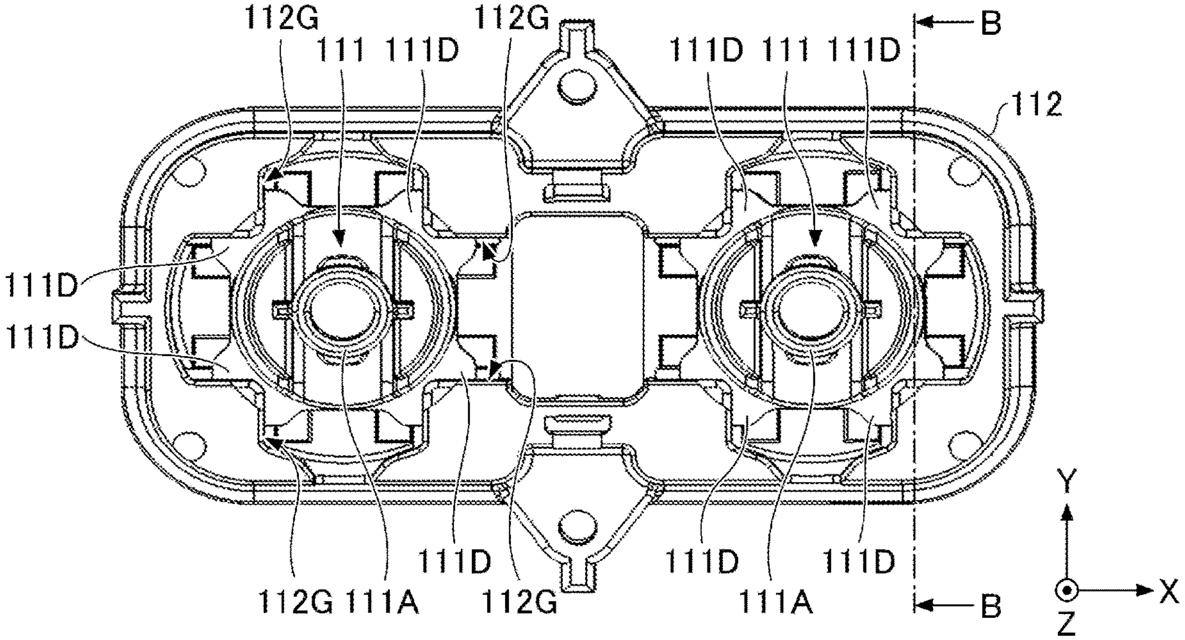
FIG. 12 is a plan view of a support member (in a state in which a flange of a holder member is engaged) according to one embodiment.
Figure 13:
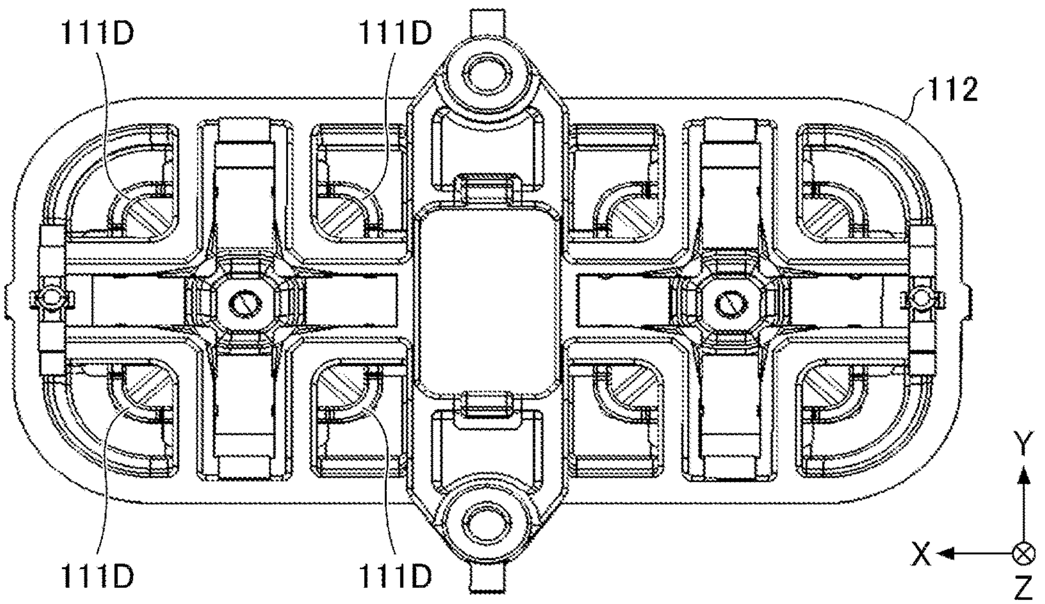
FIG. 13 is a bottom view of the support member (in a state in which a flange of a holder member is engaged) according to one embodiment.
Figure 14:
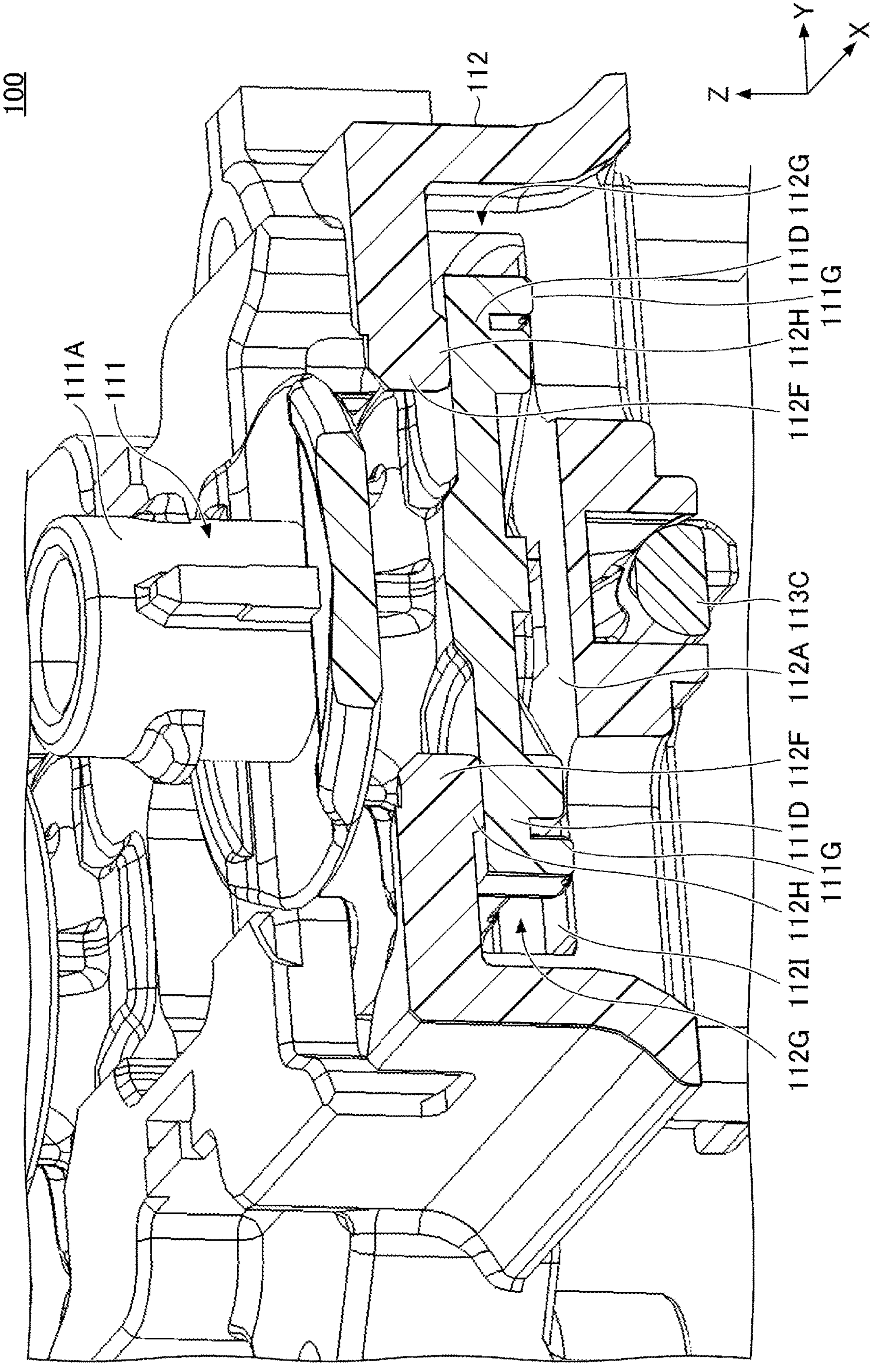
FIG. 14 is a perspective cross-sectional view illustrating a cross section of the support member illustrated in FIG. 12 along the B-B cross section line.

FIG. 10 is a plan view of the support member 112 (in a state in which the flange 111D of the holder member 111 is not engaged) according to one embodiment. FIG. 11 is a bottom view of the support member 112 (in a state in which the flange 111D of the holder member 111 is not engaged) according to one embodiment. FIG. 12 is a plan view of the support member 112 (in a state in which the flange 111D of the holder member 111 is engaged) according to one embodiment. FIG. 13 is a bottom view of the support member 112 (in a state in which the flange 111D of the holder member 111 is engaged) according to one embodiment. FIG. 14 is a perspective cross-sectional view illustrating a cross-section of the support member 112 illustrated in FIG. 12, taken along the B-B cross-section line.

As illustrated in FIG. 10 and FIG. 11, first, the holder member 111 is mounted in the recess 112B of the support member 112 such that the four flanges 111D are respectively arranged in the four grooves forming the recess 112B. At this time, the four flanges 111D of the holder member 111 are not respectively engaged with the four upper walls 112F of the support member 112, and thus the upward movement of the holder member 111 is not restricted.

Next, the holder member 111 is rotated by 45 degrees, which is a predetermined angle in the counterclockwise direction viewed from above (the arrow Dl direction illustrated in FIG. 10), with the base 111A as the center. As illustrated in FIG. 12 and FIG. 13, this causes the four flanges 111D of the holder member 111 to be respectively inserted into the four slits 112G of the support member 112 and to be respectively engaged with the four upper walls 112F of the support member 112. This restricts the upward movement of the holder member 111.

As illustrated in FIG. 13, the upper surface of the flange 111D inserted into the slit 112G contacts the upper side contact surface 112H provided at a position where the upper wall 112F slightly projects downward from the lower surface thereof. Additionally, the lower surface of the flange 111D inserted into the slit 112G contacts the lower side contact surface 112I provided at a position where the middle wall 112A slightly projects upward from the upper surface thereof. With this configuration, the flange 111D can be moved in the horizontal direction in the slit 112G, and the movement in the vertical direction is restricted by the upper side contact surface 112H and the lower side contact surface 112I.

As described, in the switch device 100 according to one embodiment, the holder member 111 and the support member 112 can assembled by performing a simple work of mounting the holder member 111 in the recess 112B and then rotating the holder member 111 by the predetermined angle (45 degrees). The assembled holder member 111 is attached such that the holder member 111 can be moved in the horizontal direction with respect to the support member 112 and a vertical rattling movement is not caused.

Figure 15:
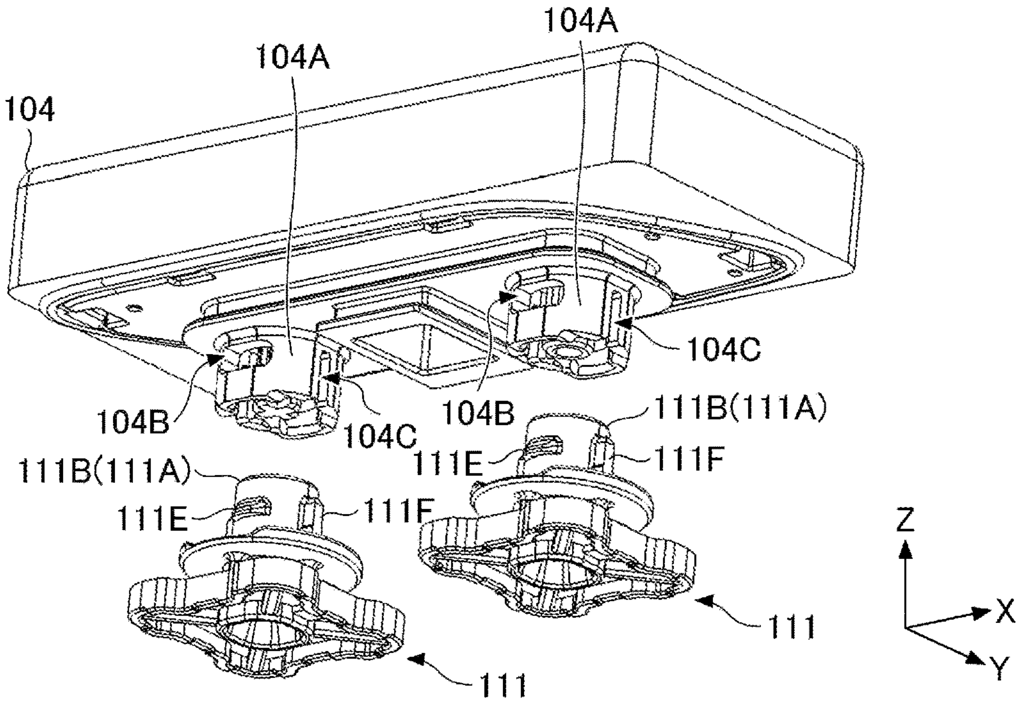
FIG. 15 is an external perspective view of an operation knob and the holder member (not combined with each other) in one embodiment.
Figure 16:
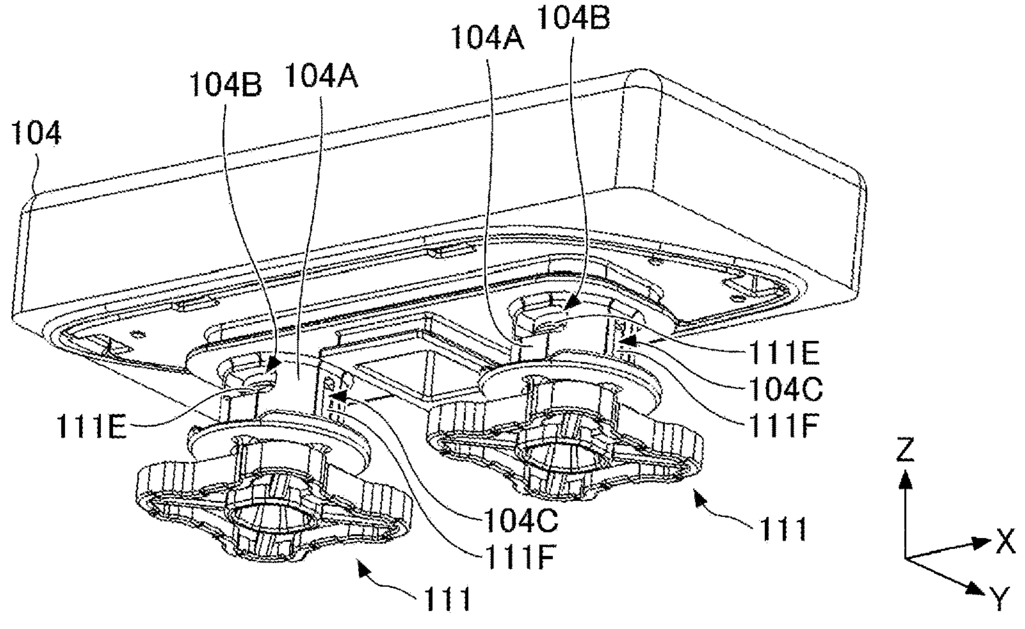
FIG. 16 is an external perspective view of the operation knob and the holder member (combined with each other) in one embodiment.

FIG. 15 is an external perspective view of the operation knob 104 and the holder member 111 (not combined with each other) according to one embodiment. FIG. 16 is an external perspective view of the operation knob 104 and the holder member 111 (combined with each other) according to one embodiment.

As illustrated in FIG. 15, on the outer peripheral surface of the upper cylinder 111B of the base 111A of the holder member 111, a projection 111E and a rib 111F are provided projecting outward.

With respect to the above, as illustrated in FIG. 15, an opening 104B and a groove 104C (an example of a “rotation restricting section”) are formed in the outer peripheral wall of the shaft 104A of the operation knob 104.

As illustrated in FIG. 16, the operation knob 104 is held by the holder member 111 by the shaft 104A thereof being fitted into the upper cylinder 111B of the holder member 111.

At this time, as illustrated in FIG. 16, the projection 111E of the holder member 111 is fitted into the opening 104B of the operation knob 104, so that the operation knob 104 does not easily fall off the holder member 111.

Additionally, as illustrated in FIG. 16, the rib 111F of the holder member 111 is inserted into the groove 104C of the operation knob 104 to restrict the rotation of the holder member 111.

As described above, the holder member 111 is supported by the support member 112 by rotating the holder member 111. Thus, the holder member 111 may fall off the support member 112 by unintentionally rotating the holder member 111 from being in a state in which the holder member 111 is supported by the support member 112. Therefore, in the switch device 100 according to one embodiment, as described with reference to FIG. 15 and FIG. 16, by attaching the operation knob 104 to the holder member 111, the rotation of the holder member 111 can be restricted by the operation knob 104. This enables the switch device 100 according to one embodiment to prevent the holder member 111 from falling from the support member 112.

(Description of the Assembly Process)

Figure 17:
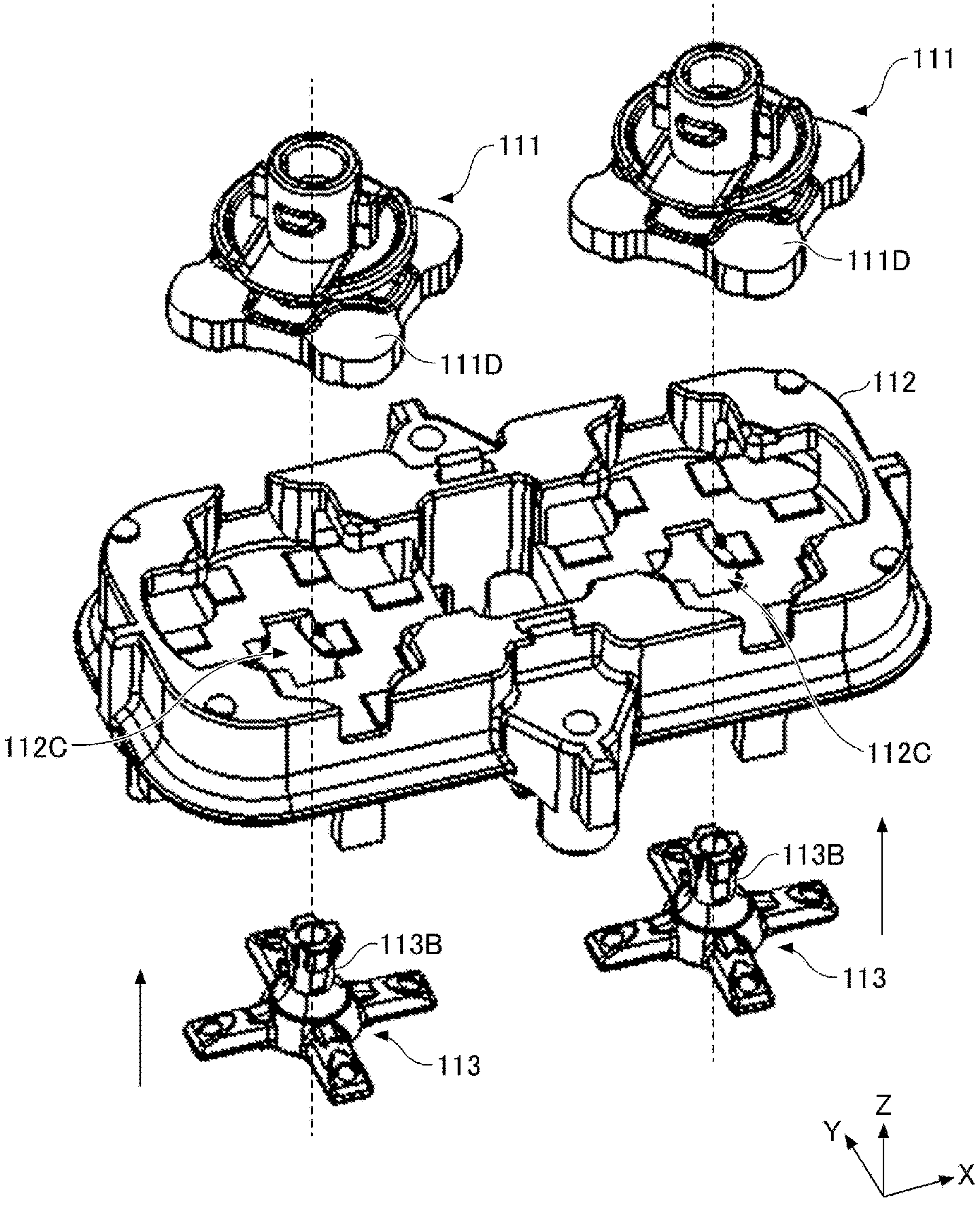
FIG. 17 is a partially exploded perspective view (a) illustrating a method of assembling the drive member, the support member, and the holder member according to one embodiment.
Figure 18:
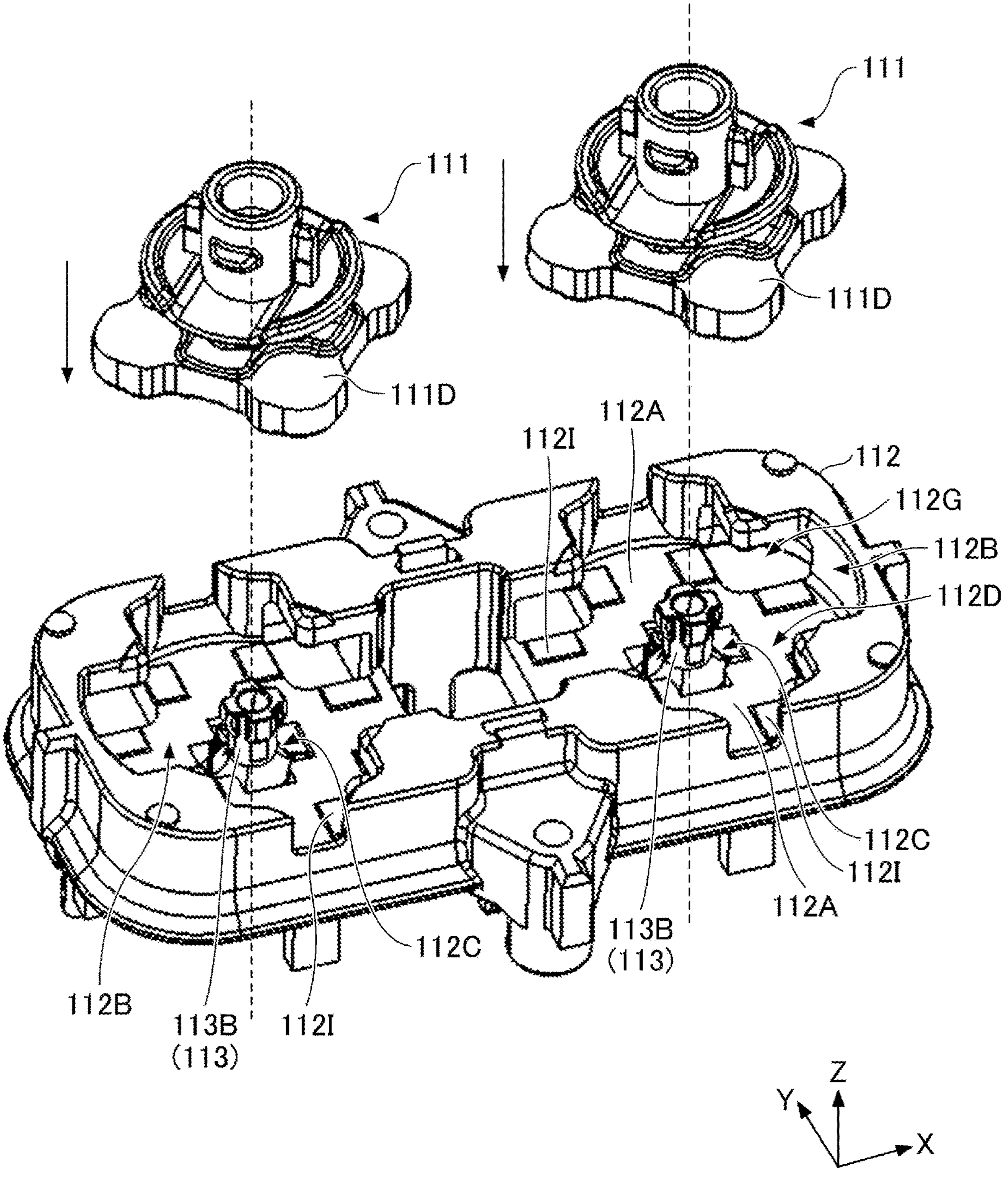
FIG. 18 is a partially exploded perspective view (b) illustrating the method of assembling the drive member, the support member, and the holder member according to one embodiment.
Figure 19:
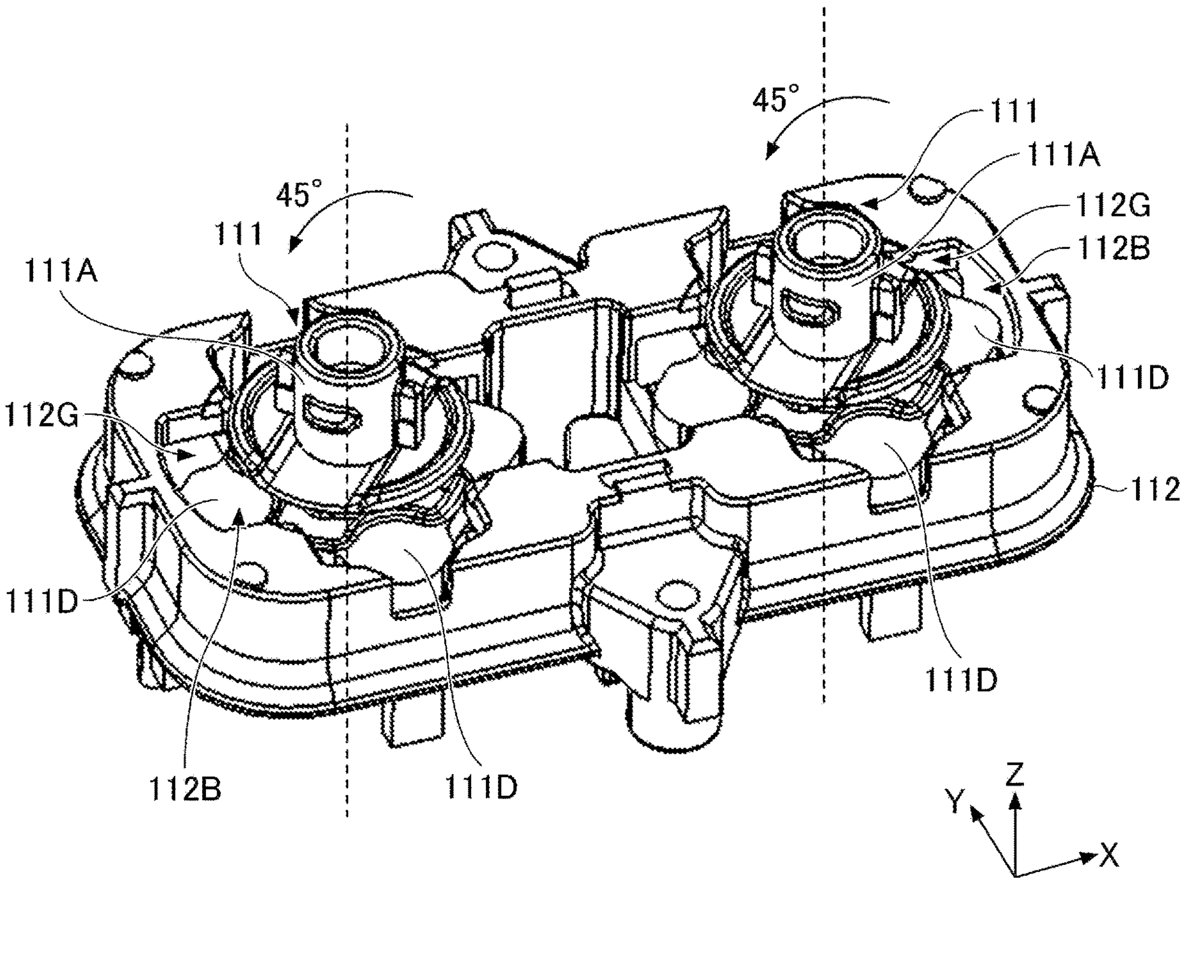
FIG. 19 is a partially exploded perspective view (c) illustrating the method of assembling the drive member, the support member, and the holder member according to one embodiment.
Figure 20:
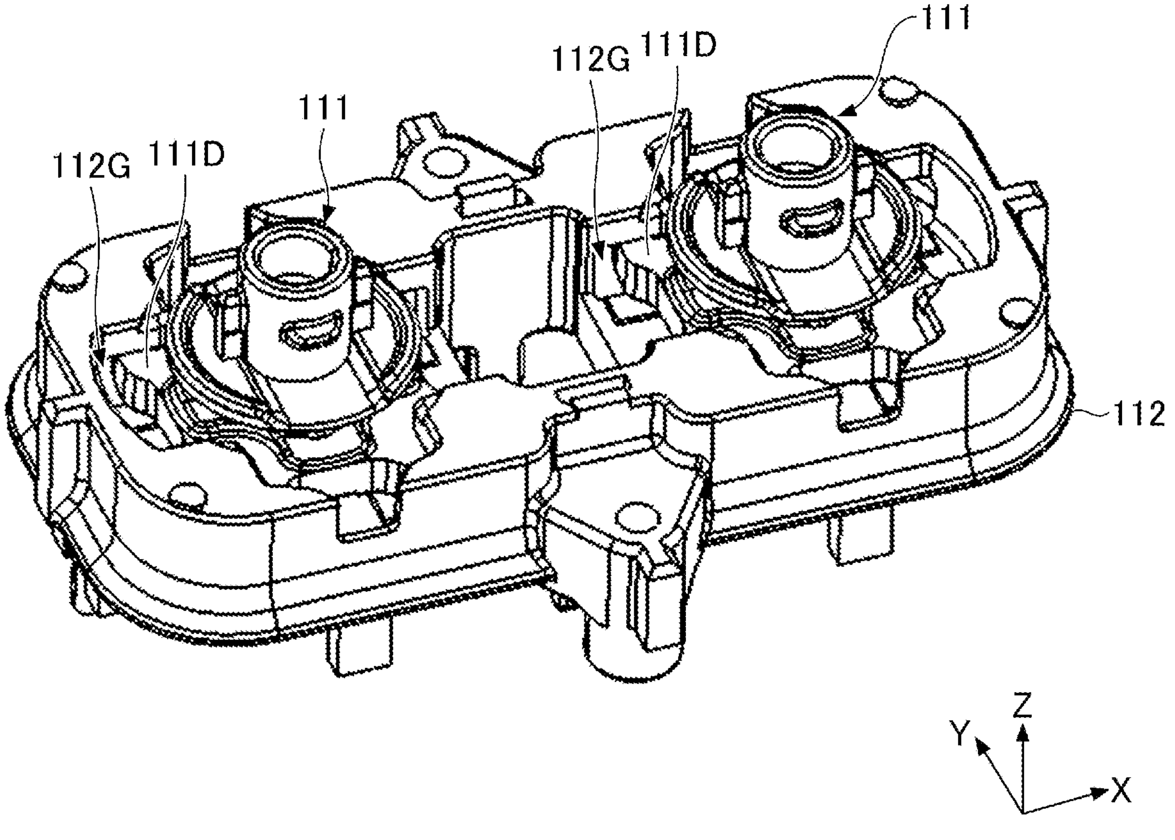
FIG. 20 is a partially exploded perspective view (d) illustrating the method of assembling the drive member, the support member, and the holder member according to one embodiment.
Figure 21:
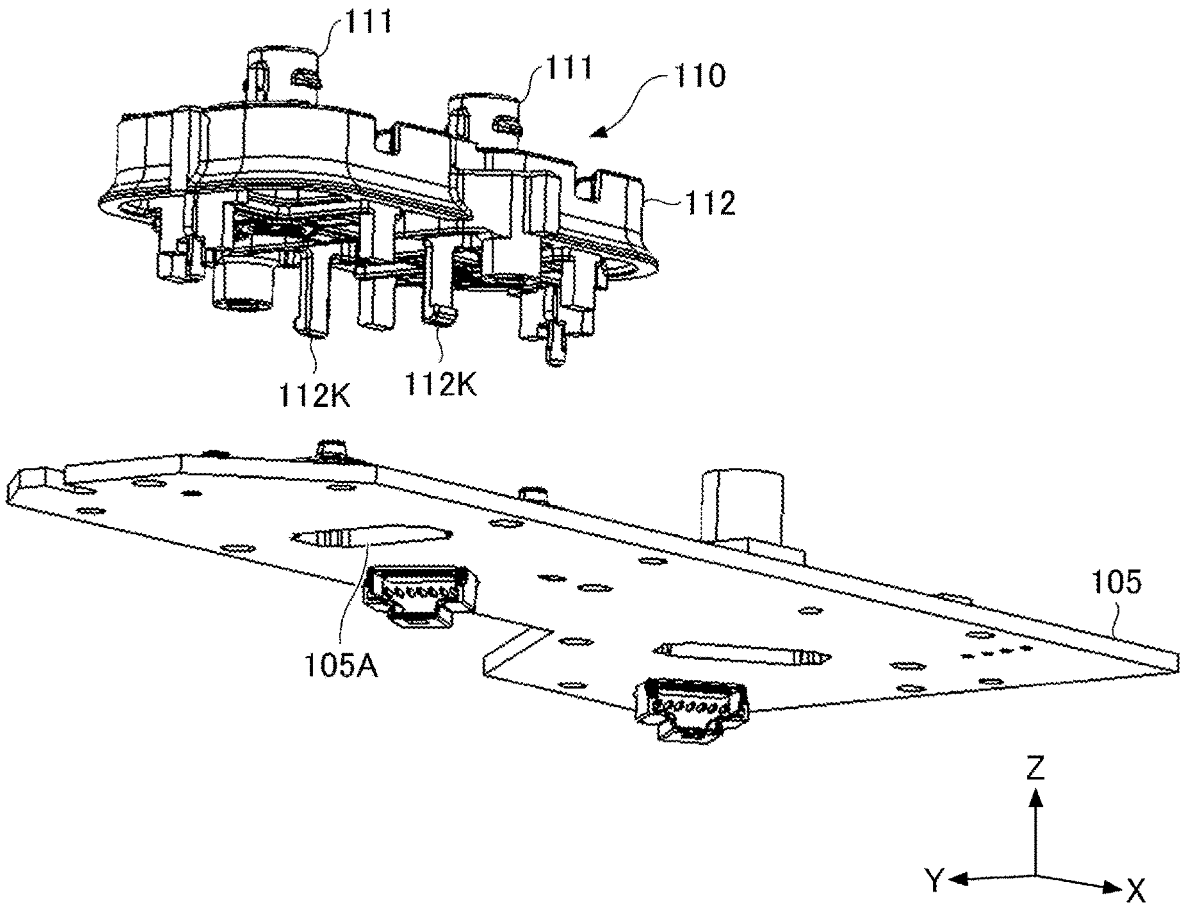
FIG. 21 is a partially exploded perspective view (a) illustrating a method of assembling the support member and a circuit board according to one embodiment.
Figure 22:
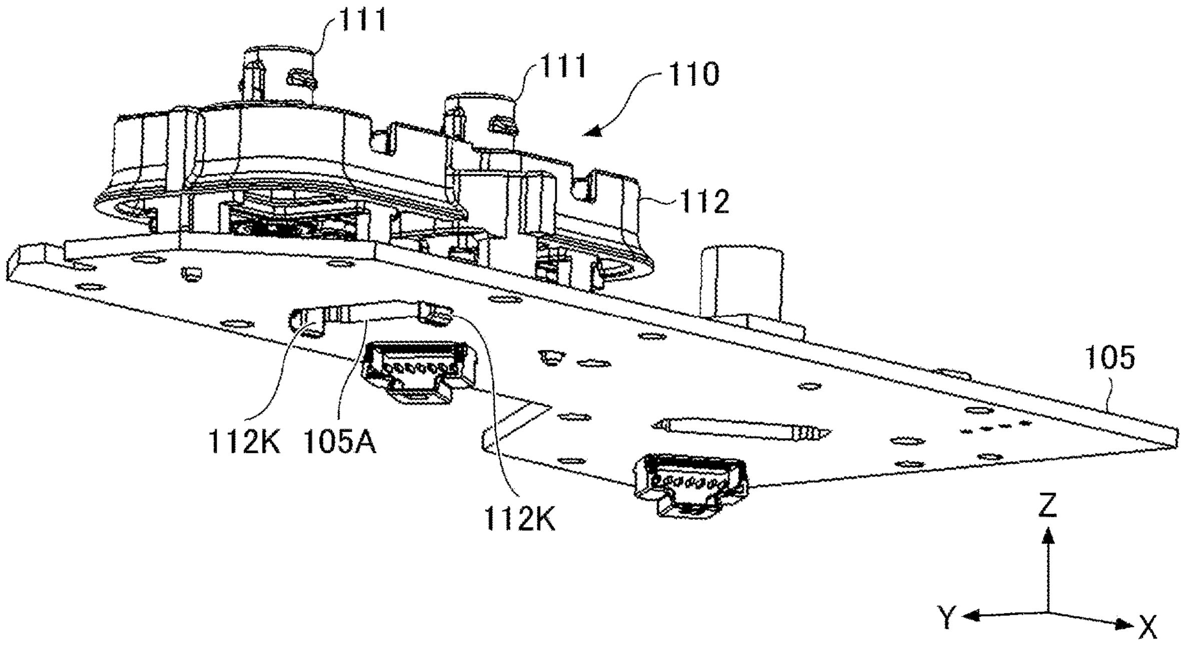
FIG. 22 is a partially exploded perspective view (b) illustrating the method of assembling the support member and the circuit board according to one embodiment.

FIGS. 17 to 22 are views illustrating the assembly process of the switch device 100 according to one embodiment. FIG. 17 is a partially exploded perspective view (a) illustrating a method of assembling the drive member 113, the support member 112, and the holder member 111 according to one embodiment. FIG. 18 is a partially exploded perspective view (b) illustrating the method of assembling the drive member 113, the support member 112, and the holder member 111 according to one embodiment. FIG. 19 is a partially exploded perspective view (c) illustrating the method of assembling the drive member 113, the support member 112, and the holder member 111 according to one embodiment. FIG. 20 is a partially exploded perspective view (d) illustrating the method of assembling the drive member 113, the support member 112, and the holder member 111 according to one embodiment. FIG. 21 is a partially exploded perspective view (a) illustrating a method of assembling the support member 112 and the circuit board 105 according to one embodiment. FIG. 22 is a partially exploded perspective view (b) illustrating the method of assembling the support member 112 and the circuit board 105 according to one embodiment.

<Drive Member Accommodating Process>

First, as illustrated in FIG. 17 and FIG. 18, the drive member 113 is placed below the support member 112, moved upward toward the support member 112, and accommodated in the accommodating part 112D. With respect to the drive member 113 accommodated in the accommodating part 112D, the shaft 113B is inserted into the opening 112C. Here, the process of assembling the drive member 113 and the support member 112 may be performed after the process of assembling the holder member 111 and the support member 112, which will be described later in detail.

<Holder Member Mounting Process>

Next, as illustrated in FIG. 18, the holder member 111 is placed above the support member 112, is moved downward toward the support member 112 until the lower surface of the flange 111D contacts the lower side contact surface 112I, and is mounted in the recess 112B. At this time, the drive member 113 is connected to the holder member 111 with the support member 112 being sandwiched between the drive member 113 and the holder member 111, by fitting the upper end of the shaft 113B into the lower cylinder inner portion 111C of the base 111A of the holder member 111.

When viewed from above, the four flanges 111D of the holder member 111 are provided having a square outer shape. The recess 112B of the support member 112 is provided having a square shape slightly larger than the square shape famed by the four flanges 111D, viewed from above. Therefore, the flanges 111D and the recess 112B can be easily combined at an angle at which the square shapes meet. Here, in the present embodiment, the flanges 111D and the recess 112B are provided in a square shape, but the flanges 111D and the recess 112B may be provided in a polygonal shape other than a square shape.

Because the lower side contact surface 112I is a part locally provided on a portion of the middle wall 112A, the configuration can easily improve the dimensional accuracy locally. With respect to this, the operation of the holder member 111 can be precisely restricted in the process of assembling the holder member 111 and the support member 112, thereby reducing work errors in the assembly process.

<Holder Member Rotation Process>

Next, as illustrated in FIG. 19 and FIG. 20, the holder member 111 mounted in the recess 112B is rotated by 45 degrees about the axis formed by the base 111A. When the holder member 111 is rotated by 45 degrees, the flange 111D is inserted into the slit 112G, and the upper surface of the flange 111D contacts the upper side contact surface 112H. This restricts upward movement of the holder member 111 with respect to the support member 112 and enables horizontal movement.

<Circuit Board Mounting Process>

Next, as illustrated in FIG. 21 and FIG. 22, after the support member 112 is assembled with the drive member 113 and the holder member 111, the support member 112 is placed above the circuit board 105, and then is assembled with the circuit board 105. In the first step of this assembly process, the support member 112 and the circuit board 105 are tentatively assembled by engaging them using a snap-in shape (112K and 105A) (a tentative assembly process). After the tentative assembly using the snap-in shape, the support member 112 and the circuit board 105 are bolted (a bolting process). By performing the tentative assembly process first, the bolting process becomes easy and work error of the whole assembly process can be reduced.

As described above, the switch device 100 according to one embodiment includes the operation knob 104 on which a sliding operation can be performed in the horizontal direction, the holder member 111 configure to hold the operation knob 104 and move in the horizontal direction integrally with the operation knob 104, the drive member 113 that can tilt with the movement of the holder member 111 in the horizontal direction, the switch 106 that is pressed down by the drive member 113 with the tilt of the drive member 113, and the support member 112 that supports the holder member 111 such that the holder member 111 can move in the horizontal direction. The holder member 111 has the base 111A provided at the center in the horizontal direction and the flange 111D that extends outward in the horizontal direction from the base 111A. The support member 112 has the upper wall 112F that restricts the movement of the holder member 111 in the vertical direction by contacting the upper surface of the flange 111D.

With this, in the switch device 100 according to one embodiment, both the holder member 111 and the drive member 113 can be supported by the support member 112, so that the number of parts can be reduced. Additionally, the switch device 100 according to one embodiment can suppress the rattling movement of the holder member 111 in the vertical direction with the upper wall 112F of the support member 112. Therefore, according to the switch device 100 according to one embodiment, the rattling movement of the operation transmission system included in the switch device 100 and the operation knob 104 can be suppressed.

Additionally, in the switch device 100 according to one embodiment, the support member 112 has the slit 112G having a constant vertical width between the upper wall 112F and the middle wall 112A that is below the upper wall 112F, and the flange 111D is inserted into the slit 112G, so that the movement of the holder member 111 in the vertical direction is restricted while the holder member 111 can move in the horizontal direction.

This allows the switch device 100 according to one embodiment to suppress the rattling movement of the holder member 111 in the vertical direction from both the upper and lower sides of the holder member 111 with the upper wall 112F and the middle wall 112A of the support member 112. Therefore, according to the switch device 100 according to one embodiment, the rattling movement of the operation transmission system provided in the switch device 100 and the operation knob 104 can be suppressed.

Additionally, in the switch device 100 according to one embodiment, the upper wall 112F has the upper side contact surface 112H that is provided at a position where the upper wall 112F projects downward from the lower surface of the upper wall 112F and that contacts the upper surface of the flange 111D.

This allows the switch device 100 according to one embodiment to locally improve the dimensional accuracy of the upper side contact surface 112H that contacts the upper surface of the flange 111D. Therefore, according to the switch device 100 according to one embodiment, the rattling movement of the operation transmission system provided in the switch device 100 and the operation knob 104 can be suppressed.

Additionally, in the switch device 100 according to one embodiment, the middle wall 112A has the lower side contact surface 112I that is provided at a position where the middle wall 112A projects upward from the upper surface of the middle wall 112A and that contacts the sliding contact surface 111G provided on the lower surface of the holder member 111.

The lower side contact surface 112I has a locally provided shape. The lower side contact surface 112I is provided with high dimensional accuracy by forming the support member 112 by using mold technology. This allows the switch device 100 according to one embodiment to improve the accuracy of the operation of the holder member 111 in which the lower side contact surface 112I and the sliding contact surface 111G slide with each other, so that the rattling movement of the operation transmission system provided in the switch device 100 and the operation knob 104 can be suppressed.

Additionally, in the switch device 100 according to one embodiment, the support member 112 has the recess 112B whose inner bottom surface is the upper surface of the middle wall 112A and where the holder member 111 can be mounted from above, and the upper wall 112F and the slit 112G are provided at positions corresponding to each of the flanges 111D when the holder member 111 mounted in the recess 112B is rotated by at a predetermined angle.

With this, in the switch device 100 according to one embodiment, the holder member 111 can be mounted to the support member 112 such that the holder member 111 can be moved in the horizontal direction and no rattling movement occurs in the vertical direction, only by rotating the holder member 111 mounted in the recess 112B by a predetermined angle.

Additionally, in the switch device 100 according to one embodiment, the holder member 111 has multiple flanges 111D, and the upper wall 112F and the slit 112G are provided at positions corresponding to each of the multiple flanges 111D when the holder member 111 mounted in the recess 112B is rotated by a predetermined angle.

This allows the switch device 100 according to one embodiment to suppress the rattling movement in the vertical direction with respect to each of the multiple flanges 111D of the holder member 111 with the multiple upper walls 112F of the support member 112. Therefore, according to the switch device 100 according to one embodiment, the rattling movement of the operation transmission system provided in the switch device 100 and the operation knob 104 can be suppressed.

Additionally, in the switch device 100 according to one embodiment, the holder member 111 has four flanges 111D respectively extending from the base 111A in the four directions in the horizontal direction, and the upper wall 112F and the slit 112G are provided at positions corresponding to each of the four flanges 111D when the holder member 111 mounted in the recess 112B is rotated by a predetermined angle.

This allows the switch device 100 according to one embodiment to suppress the rattling movement in the vertical direction with respect to each of the four flanges 111D of the holder member 111 with the four upper walls 112F of the support member 112. Therefore, according to the switch device 100 according to one embodiment, the rattling movement of the operation transmission system provided in the switch device 100 and the operation knob 104 can be suppressed.

Additionally, in the switch device 100 according to one embodiment, the operation knob 104 has the groove 104C that restricts the rotation of the holder member 111 in a state in which the holder member 111 is rotated by a predetermined angle and the flange 111D is inserted into the slit 112G.

This allows the switch device 100 according to one embodiment to prevent falling off the support member 112 due to the unintended rotation of the holder member 111.

Although one embodiment of the present invention has been described in detail above, the present invention is not limited to these embodiments, and various modifications and alterations can be made within the scope of the subject matter of the invention as recited in the claims.

For example, in the above embodiment, an example of applying the present invention to a power seat switch for a vehicle has been described, but the embodiment is not limited thereto, and the present invention can be applied to any switch device.

What is claimed is:

1. A switch device comprising:

an operation knob on which a sliding operation can be performed in a horizontal direction;

a holder member configured to hold the operation knob and move in the horizontal direction integrally with the operation knob;

a drive member configured to tilt as the holder member moves in the horizontal direction;

a switch that is pressed down by the drive member as the drive member tilts; and a support member configured to support the holder member such that the holder member can move in the horizontal direction, wherein the holder member has a base that is provided at a center of the holder member in the horizontal direction and a flange that extends outward from the base in the horizontal direction, and wherein the support member has an upper wall that restricts a movement of the holder member in a vertical direction by contacting an upper surface of the flange, and a slit that is provided between the upper wall and a middle wall lower than the upper wall and that has a fixed vertical width.

2. The switch device as claimed in claim 1, wherein the support member has a recess where the holder member can be mounted from above, an upper surface of the middle wall being an inner bottom surface of the recess, and wherein the upper wall and the slit are provided at positions corresponding to where the flange is located when the holder member mounted in the recess is rotated by a predetermined angle.

3. The switch device as claimed in claim 2, wherein the upper wall has an upper side contact surface that is provided at a position where the upper wall projects downward from a lower surface of the upper wall and that is in contact with the upper surface of the flange.

4. The switch device as claimed in claim 2, wherein the holder member has a sliding contact surface formed, on a lower surface side, to continue from a lower surface of the flange, and wherein the middle wall has a lower side contact surface that is provided at a position where the middle wall projects from the upper surface of the middle wall upward and that is in contact with the sliding contact surface.

5. The switch device as claimed in claim 2, wherein the flange is a first flange and the slit is a first slit, wherein the switch device further includes a second flange and a second slit, wherein the first slit is provided at a first position corresponding to where the first flange is provided and the second slit is provided at a second position corresponding to where the second flange is provided when the holder member mounted in the recess is rotated by a predetermined angle.

6. The switch device as claimed in claim 2, wherein the flange is a first flange and the slit is a first slit, wherein the switch device further includes a second flange, a third flange, and a fourth flange, wherein the first flange, the second flange, the third flange, and the fourth flange respectively extend in four directions from the base in a horizontal plane, wherein the switch device further includes a second slit, a third slit, and a fourth slit, wherein the first slit is provided at a first position corresponding to where the first flange is provided, the second slit is provided at a second position corresponding to where the second flange is provided, the third slit is provided at a third position corresponding to where the third flange is provided, and the fourth slit is provided at a fourth position corresponding to where the fourth flange is provided when the holder member mounted in the recess is rotated by a predetermined angle.

7. The switch device as claimed in claim 2, wherein the operation knob has a rotation restricting section that restricts a rotation of the holder member in a state in which the holder member is rotated by the predetermined angle and the flange is inserted into the slit.

8. The switch device as claimed in claim 1, wherein the flange is inserted into the slit, so that the movement of the holder member in the vertical direction is restricted while the holder member can move in the horizontal direction.

9. A method of assembling the switch device as claimed in claim 1, the method comprising:

accommodating the drive member in the support member from a lower side of the support member;

mounting the holder member on the support member from an upper side of the support member, and combining the holder member to the drive member with the support member being interposed between the holder member and the drive member; and inserting the flange of the holder member into the slit of the support member by rotating the holder member mounted in the support member by a predetermined angle.

* * * * *